United States Patent
Jung et al.

(10) Patent No.: US 9,961,610 B2
(45) Date of Patent: May 1, 2018

(54) METHOD FOR COMMUNICATING IN WIRELESS COMMUNICATION SYSTEM SUPPORTING MULTIPLE ACCESS NETWORK AND APPARATUS SUPPORTING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 14/653,749

(22) PCT Filed: Dec. 19, 2013

(86) PCT No.: PCT/KR2013/011907
§ 371 (c)(1),
(2) Date: Jun. 18, 2015

(87) PCT Pub. No.: WO2014/098506
PCT Pub. Date: Jun. 26, 2014

(65) Prior Publication Data
US 2015/0327150 A1  Nov. 12, 2015

Related U.S. Application Data

(60) Provisional application No. 61/739,705, filed on Dec. 19, 2012.

(51) Int. Cl.
*H04W 40/12* (2009.01)
*H04W 48/16* (2009.01)
(Continued)

(52) U.S. Cl.
CPC ............ *H04W 40/12* (2013.01); *H04W 8/005* (2013.01); *H04W 36/0005* (2013.01);
(Continued)

(58) Field of Classification Search
CPC . H04W 24/10; H04W 36/0083; H04W 48/16; H04W 36/0066; H04W 36/14;
(Continued)

(56) References Cited

U.S. PATENT DOCUMENTS 9,392,522 B2 *  7/2016  Stojanovski ............ H04L 45/22
2002/0021673 A1    2/2002  Agin et al.
(Continued)

FOREIGN PATENT DOCUMENTS

CN    102209358 A    10/2011
CN    102318237 A    1/2012
(Continued)

OTHER PUBLICATIONS

3GPP, "3rd Generation Partnership Project; Technical Specification Group Radio Access Network; Study on WLAN/3GPP Radio Interworking (Release 12)," 3GPP TR 37.834 V0.2.1, May 2013, pp. 1-15.

(Continued)

*Primary Examiner* — Hoang-Chuong Q Vu
(74) *Attorney, Agent, or Firm* — Birch, Stewart, Kolasch & Birch, LLP

(57) ABSTRACT

Provided is a method for communicating performed by a terminal in a wireless communication system. The method comprises receiving a traffic routing configuration from a first access network, the traffic routing configuration specifying a traffic routing criteria for routing and processing traffic, discovering at least one second network entity by searching a second access network, conducting a traffic routing evaluation to determine whether the at least one
(Continued)

second access network satisfies the traffic routing criteria, reporting a routing evaluation result to the first access network when the traffic routing criteria are satisfied, receiving a traffic routing indication from the first access network, and processing the traffic based on the traffic routing indication. When the traffic routing indication indicates traffic of the first access network is processed through the second access network, the traffic of the first access network is processed through the second access network.

14 Claims, 14 Drawing Sheets

(51) Int. Cl.
*H04W 72/08* (2009.01)
*H04W 76/06* (2009.01)
*H04W 8/00* (2009.01)
*H04W 36/00* (2009.01)
*H04W 36/14* (2009.01)
*H04W 36/22* (2009.01)
*H04W 36/30* (2009.01)
*H04W 84/12* (2009.01)
*H04W 28/08* (2009.01)

(52) U.S. Cl.
CPC .......... *H04W 36/14* (2013.01); *H04W 36/22* (2013.01); *H04W 36/30* (2013.01); *H04W 48/16* (2013.01); *H04W 72/085* (2013.01); *H04W 76/06* (2013.01); *H04W 28/08* (2013.01); *H04W 84/12* (2013.01)

(58) Field of Classification Search
CPC ... H04W 36/22; H04W 48/18; H04W 84/005; H04W 76/023; H04W 36/26
See application file for complete search history.

(56) References Cited

U.S. PATENT DOCUMENTS

| | | | |
|---|---|---|---|
| 2005/0202823 | A1 | 9/2005 | Shaheen et al. |
| 2006/0111107 | A1 | 5/2006 | Zhang |
| 2007/0133468 | A1 | 6/2007 | Hara |
| 2011/0075675 | A1* | 3/2011 | Koodli ............... H04L 12/14 370/401 |
| 2011/0134882 | A1* | 6/2011 | Aoyama ........... H04W 36/0066 370/331 |
| 2011/0182270 | A1 | 7/2011 | Shaheen et al. |
| 2011/0222523 | A1 | 9/2011 | Fu et al. |
| 2012/0244903 | A1* | 9/2012 | Fong ...................... H04W 8/20 455/517 |
| 2013/0079017 | A1* | 3/2013 | Mach ............... H04W 36/0083 455/441 |
| 2014/0235249 | A1* | 8/2014 | Jeong .................... H04W 36/26 455/436 |
| 2014/0241322 | A1* | 8/2014 | Kim ................. H04W 36/0016 370/331 |
| 2015/0038151 | A1* | 2/2015 | Dalsgaard ......... H04W 36/0083 455/444 |
| 2015/0139189 | A1* | 5/2015 | Li ..................... H04W 36/0055 370/331 |
| 2015/0139195 | A1* | 5/2015 | Xiao .................... H04W 36/22 370/332 |
| 2015/0189557 | A1* | 7/2015 | Touati ............... H04W 36/0066 370/332 |

FOREIGN PATENT DOCUMENTS

| | | | | |
|---|---|---|---|---|
| CN | 102655663 | A | | 9/2012 |
| CN | 102695234 | A | | 9/2012 |
| GB | 2473686 | A | * 3/2011 | ............ H04L 45/22 |
| JP | 2004-80707 | A | | 3/2004 |
| JP | 2004-526218 | A | | 8/2004 |
| JP | 2007-159005 | A | | 6/2007 |
| JP | 2007-529920 | A | | 10/2007 |
| JP | 2007-534193 | A | | 11/2007 |
| KR | 10-2002-0013768 | A | | 2/2002 |
| KR | 10-2011-0026504 | A | | 3/2011 |
| WO | WO 02/17034 | A2 | | 2/2002 |
| WO | WO 2010/003777 | A1 | | 1/2010 |
| WO | WO 2012/009557 | A2 | | 1/2012 |
| WO | WO 2012/055769 | A1 | | 5/2012 |
| WO | WO 2012/130091 | A2 | | 10/2012 |
| WO | WO 2013/024054 | A1 | | 2/2013 |

OTHER PUBLICATIONS

3GPP, "3rd Generation Partnership Project; Technical Specification Group Services and System Aspects; Optimized Offloading to WLAN in 3GPP-RAT mobility; (Release 12)," 3GPP TR 23.890 V0.1.0, May 2012, pp. 1-7.
Panasonic, "Interaction of ANDSF with enhanced policy framework" 3GPP TSG SA WG2 Meeting #80, TD S2-103526, SA WG2 Temporary Document, Aug. 30-Sep. 3, 2010, Brunstad, Norway, pp. 1-2.

* cited by examiner

METHOD FOR COMMUNICATING IN WIRELESS COMMUNICATION SYSTEM SUPPORTING MULTIPLE ACCESS NETWORK AND APPARATUS SUPPORTING SAME

CROSS REFERENCE TO RELATED APPLICATIONS

This application is the National Phase of PCT International Application No. PCT/KR2013/011907, filed on Dec. 19, 2013, which claims priority under 35 U.S.C. 119(e) to U.S. Provisional Application No. 61/739,705, filed on Dec. 19, 2012, all of which are hereby expressly incorporated by reference into the present application.

BACKGROUND OF THE INVENTION

1. Field of the Invention

The present invention relates to wireless communication, and more particularly, to a communication method performed in a wireless communication system supporting communication through a multiple access network and an apparatus supporting the same.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

The wireless communication system can support providing a service through a plurality of access networks to the terminal. The terminal can receive the service from a 3GPP based access network such as a mobile wireless communication system and further, receive a service from non-3GPP based access networks such as Worldwide Interoperability for Microwave Access (WiMAX), Wireless Local Area Network (WLAN), and the like.

Interworking between the 3GPP access network and the non-3GPP access network in the related art is a scheme in which the terminal selects the access network based on an access network discovery and selection functions (ANDSF) policy and processes traffic through the selected access network. In this scheme, a base station cannot control the interworking between the 3GPP access network and the non-3GPP access network. This cannot properly allocate a radio resource to the terminal that receives a service in a cell to cause a problem in that a quality of service (QoS) of the terminal deteriorates.

SUMMARY OF THE INVENTION

The present invention provides a method for communicating in a wireless communication system supporting a multiple access network and an apparatus supporting the same.

In an aspect, provided is a method for communicating carried out by a terminal in a wireless communication system supporting a multiple access network. The method includes receiving a traffic routing configuration from a first access network, the traffic routing configuration specifying a traffic routing criterion for routing and processing traffic, searching a second access network to discover at least one second access network entity, performing traffic routing evaluation determining whether at least one second access network entity satisfies the traffic routing criterion, reporting a routing evaluation result to the first access network when the traffic routing criterion is satisfied, receiving a traffic routing indication from the first access network and processing the traffic based on the traffic routing indication. When the traffic routing indication indicates that traffic of the first access network is processed through the second access network, in the processing of the traffic based on the traffic routing indication, the traffic of the first access network is processed through the second access network.

The traffic routing indication may indicate the second access network entity for processing the traffic of the first access network. The traffic of the first access network may be processed by the second access network entity indicated by the traffic routing indication.

The routing evaluation result may include at least one of identification information indicating at least one entity satisfying the traffic routing criterion among at least one second access network entities, channel information of at least one entity satisfying the traffic routing criterion and information on the first access network traffic.

The second access network entity indicated by the traffic routing indication may be selected by the first access network among at least one entity indicated by the identification information of the routing evaluation result.

The information on the first access network traffic may include a radio bearer identifier list associated with the first access network traffic.

The traffic routing indication may include an identifier indicating the indicated second access network entity, and traffic information on traffic of which processing through the indicated second access network entity is permitted.

The traffic information may include a radio bearer identifier list associated with the traffic of which processing through the indicated second access network entity is permitted.

The processing of the traffic of the first access network may include processing the traffic indicated by the traffic information of the traffic routing indication among the traffic of the first access network through the target second access network entity.

The traffic routing configuration may include a routing entity list including at least one second access network entity in which the traffic processing of the first access network is permitted.

The performing of the traffic routing evaluation may include deciding, when the second access network entity discovered by the search is included in the routing entity list, that the corresponding second access network entity satisfies the traffic routing criterion.

The method may further include: reporting a result of the traffic processing of the first access network to the first access network.

The method may further include: releasing a radio resource control (RRC) connection with the first access network after reporting the first access network traffic processing result.

The method may further include: receiving traffic processing confirmation from the first access network as a response to the first access network traffic processing result reporting and releasing the RRC connection with the first access network when the traffic processing confirmation indicates that the first access network traffic is normally processed.

When the traffic routing indication indicates that traffic of the second access network is processed through the first access network, the processing of the traffic based on the traffic routing indication may include processing the traffic of the second access network through the first access network.

The first access network may be a 3rd generation partnership project (3GPP) based access network, and the second access network is a wireless local area network (WLAN) based access network.

In another aspect, provided is a wireless apparatus that operates in a wireless communication system. The wireless apparatus includes a first RF unit transmitting and receiving a first access network signal, a second RF unit transmitting and receiving a second access network signal, a processor that operates in functional combination with the first RF unit and the second RF unit. The processor is configured to receive a traffic routing configuration from a first access network, the traffic routing configuration specifying a traffic routing criterion for routing and processing traffic, search a second access network to discover at least one second access network entity, perform traffic routing evaluation determining whether at least one second access network entity satisfies the traffic routing criterion, report a routing evaluation result to the first access network when the traffic routing criterion is satisfied, receive a traffic routing indication from the first access network, and process the traffic based on the traffic routing indication, and when the traffic routing indication indicates that traffic of the first access network is processed through the second access network, the processing of the traffic based on the traffic routing indication includes the traffic of the first access network through the second access network.

According to the communication method of the embodiment of the present invention, in the interworking between the 3GPP access network and the non-3GPP access network, the base station of the 3GPP access network can control the interworking. The base station controls the operation of the terminal with a control right for the terminal to control the loads of the core network and the radio link. Therefore, the base station can satisfy the terminal that receives the service in the cell or the QoS of the specific traffic of the terminal by efficiently using the radio resource.

DESCRIPTION OF EXEMPLARY EMBODIMENTS

Figure 1:
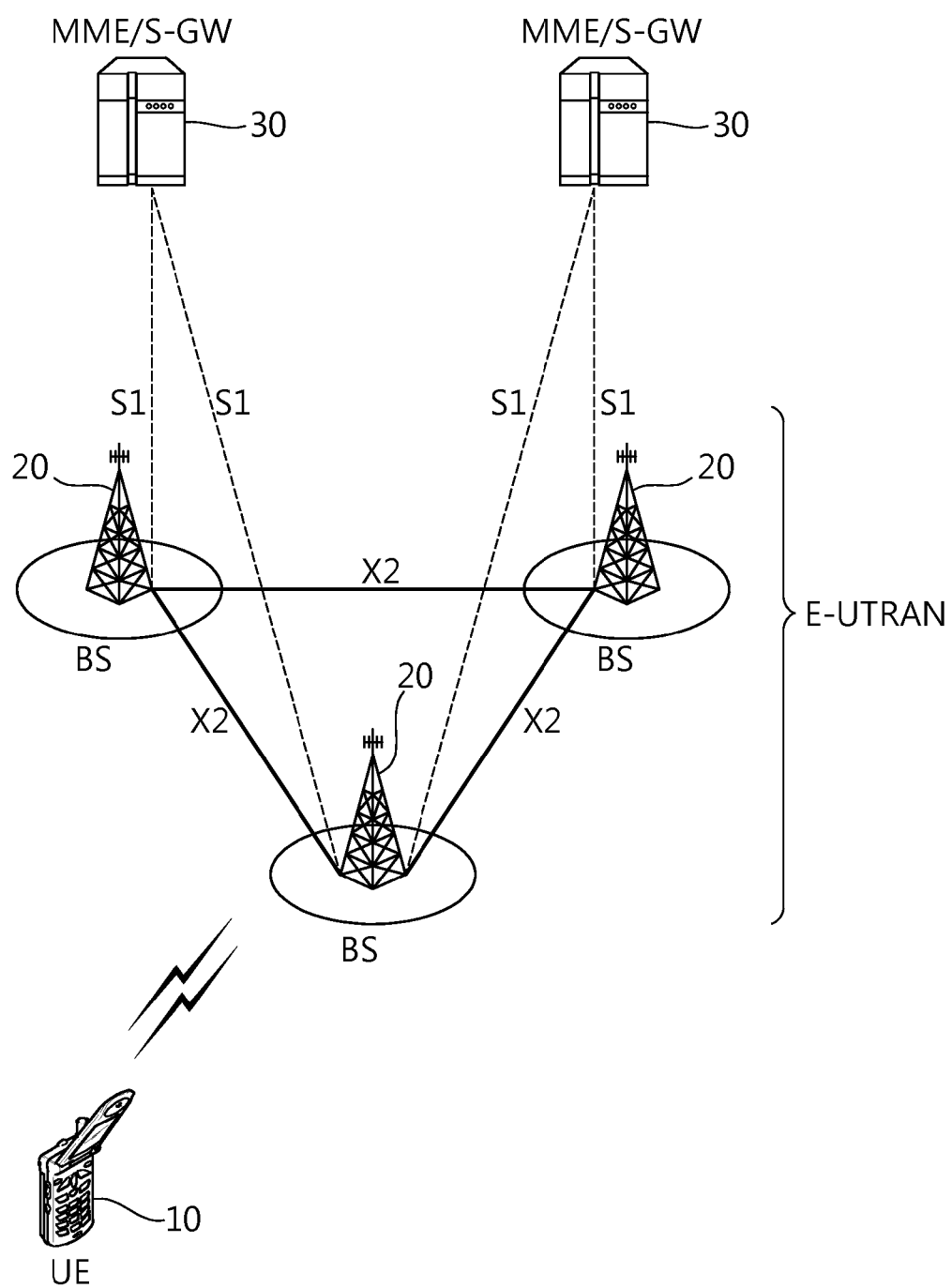
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
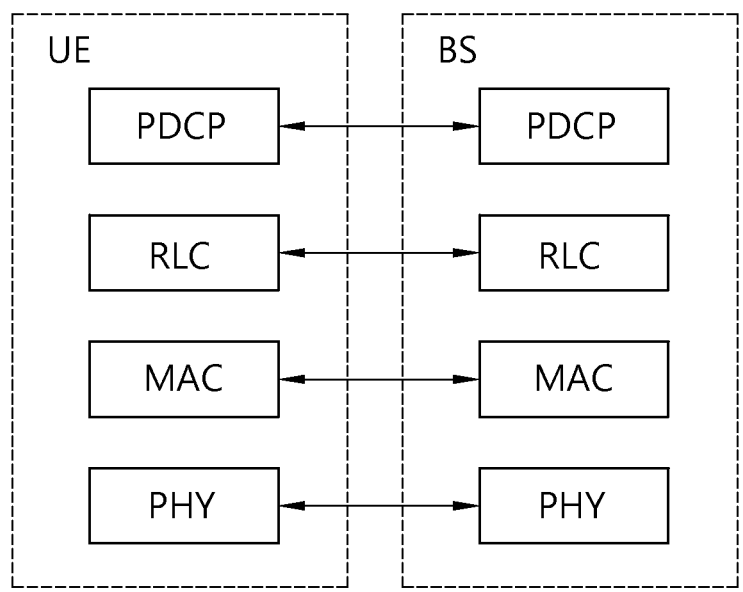
FIG. 2 is a block diagram illustrating a radio protocol architecture for a user plane.
Figure 3:
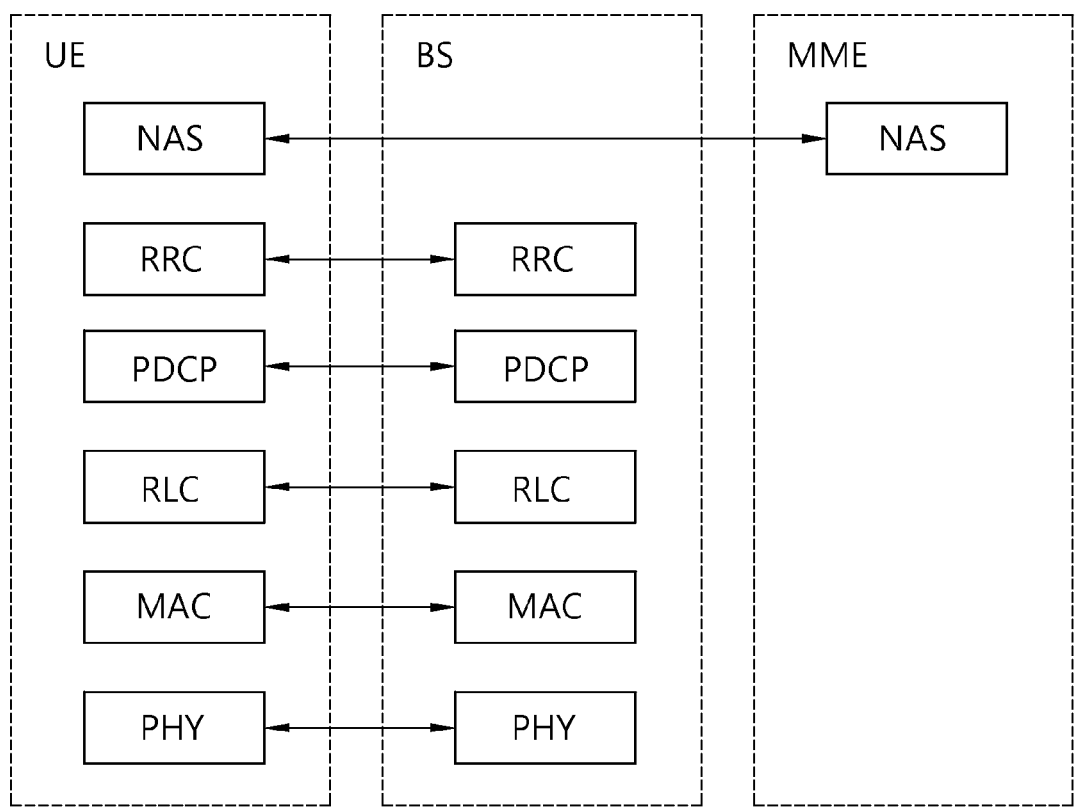
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are data channels.

The PCFICH transmitted in a first OFDM symbol of the subframe transports a control format indicator (CFI) regarding the number (that is, the size of the control region) of OFDM symbols used to transmit control channels in the subframe. The terminal first receives the CFI on the PCFICH and thereafter, monitors the PDCCH.

The PDCCH as a downlink control channel is also referred to as a scheduling channel in terms of transporting scheduling information. Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE, the terminal uses blind decoding in order to detect the PDCCH. The blind decoding is a scheme that checks a CRC error by demasking a desired identifier to a CRC of a received PDCCH (referred to as a PDCCH candidate) to check whether the corresponding PDCCH is a control channel thereof.

The base station determines a PDCCH format according to a DCI to be transmitted to the terminal and then adds a cyclic redundancy check (CRC) to the DCI, and masks a unique identifier (referred to as a radio network temporary identifier (RNTI)) to the CRC according to an owner or a usage of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle state: It needs to be guaranteed that the terminal has valid versions of the MIB and the SIB1 as well as the SIB2 to SIB8 and this may be followed by supporting a considered RAT.

In the case where the terminal is in an RRC connection state: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
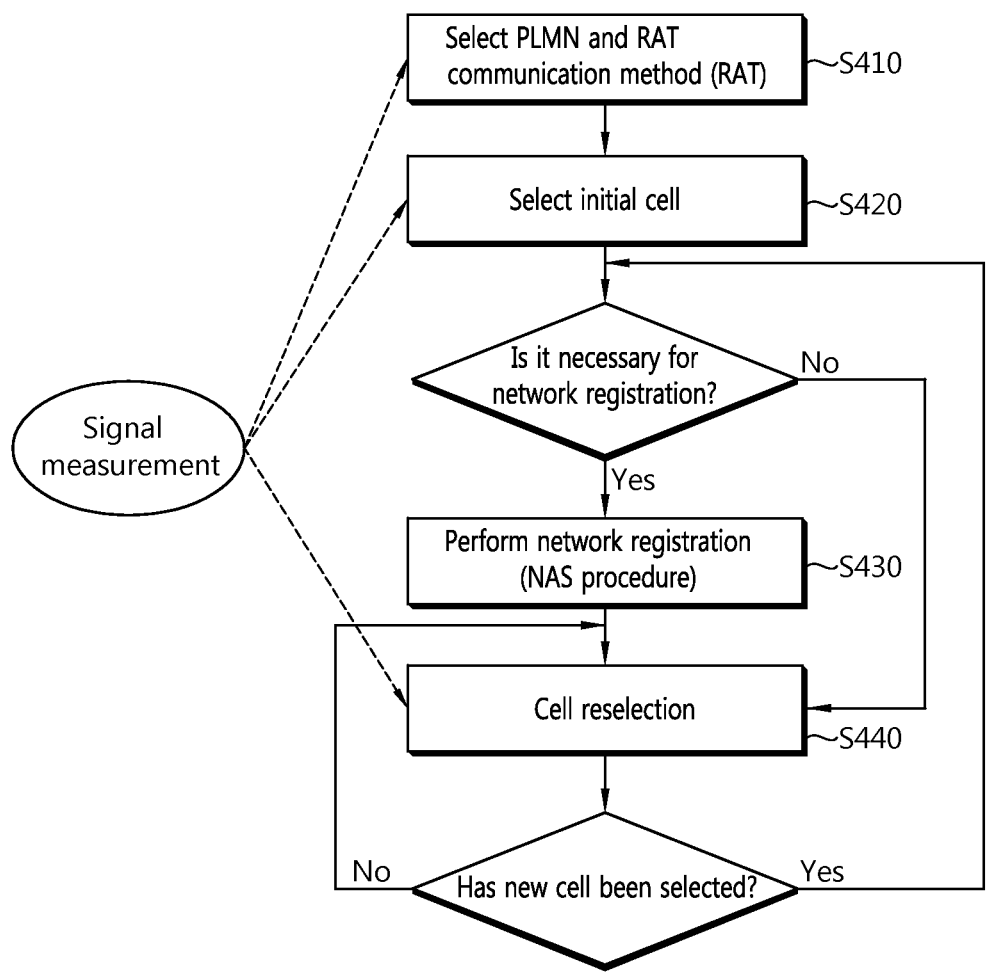
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
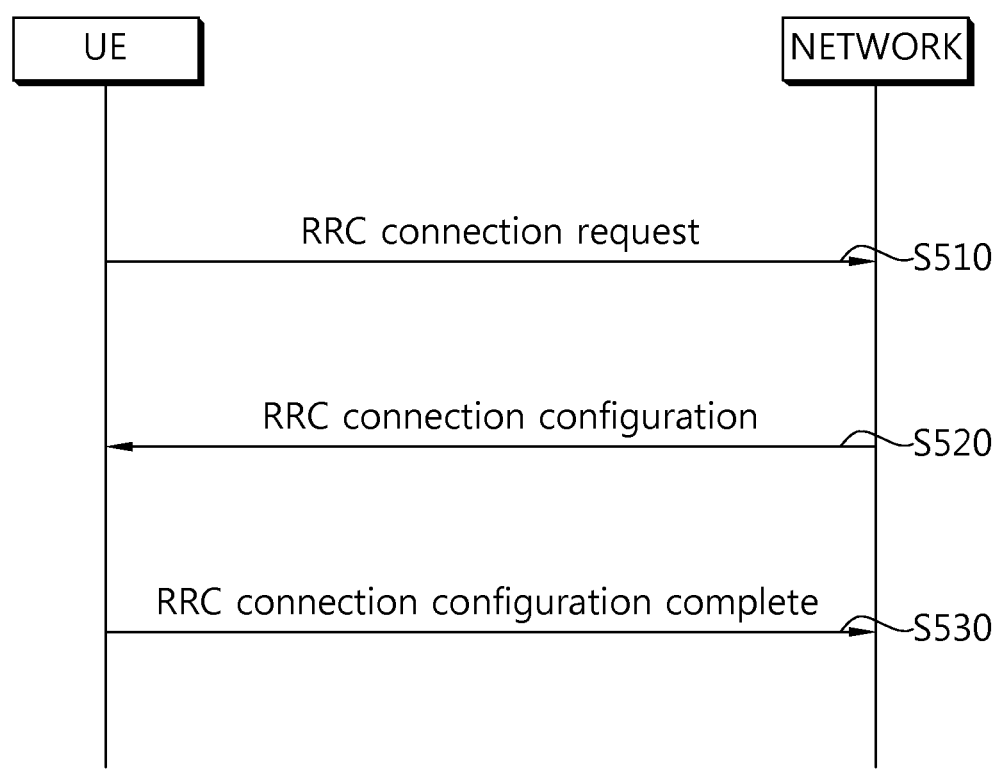
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
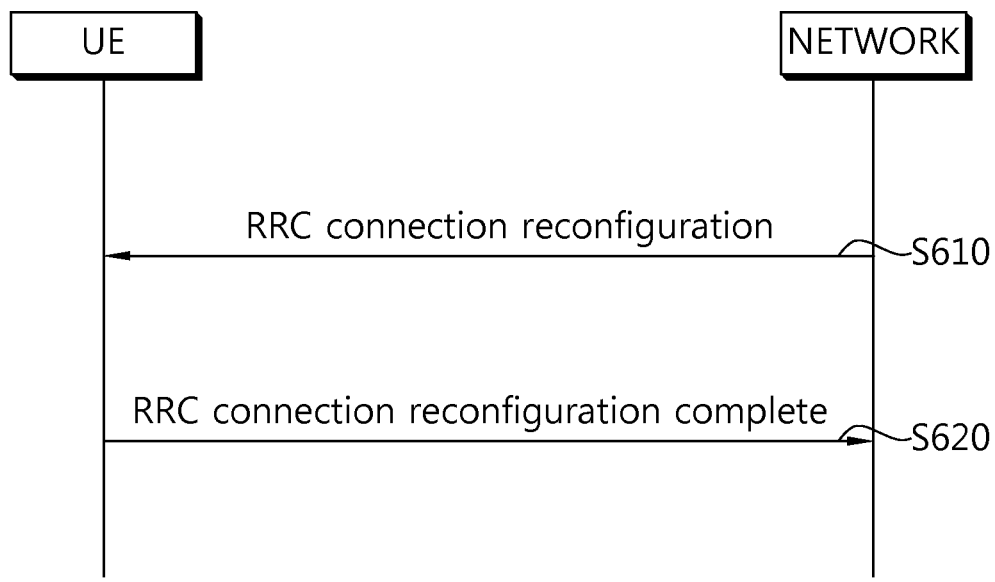
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN (Public Land Mobile Network) will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009 March) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

A cell selection criterion may be defined as shown in Equation 1 given below.

$$\text{Srxlev} > 0 \text{ AND Squal} > 0 \qquad \text{[Equation 1]}$$

where:

$$\text{Srxlev} = Q_{rxlevmeas} - (Q_{rxlevmin} + Q_{rxlevminoffset}) - P\text{compensation}$$

$$\text{Squal} = Q_{qualmeas} - (Q_{qualmin} + Q_{qualminoffset})$$

Herein, each variable of Equation 1 may be defined as shown in Table 1 given below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$ which are signaled values as a result of a periodic search for a PLMN having a higher priority while the terminal camps on a normal cell may be applied only when cell selection is evaluated. During the periodic search for the PLMN having the higher priority, the terminal may perform the cell selection evaluation by using parameter values stored from another cell of the PLMN having the higher priority.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

When the terminal (UE) perform cell reselection according to the cell reselection evaluation, the terminal may decide that a cell reselection criterion is satisfied when the cell reselection criterion is satisfied for a specific time and move the cell to the selected target cell. Herein, the specific time may be given from the network as a Treselection parameter. The Treselection may specify a cell reselection timer value and be defined with respect to each frequency and another RAT of the E-UTRAN.

Hereinafter, cell reselection information used for the cell reselection by the terminal will be described.

The cell reselection information may be transmitted while being included in the system information broadcasted from the network in a format of the cell reselection parameter and provided to the terminal. The cell reselection parameter provided to the terminal may include the following types.

Cell Reselection Priority: The cellReselectionPriority parameter specifies the priority of a frequency of the E-UTRAN, a frequency of the UTRAN, a group of GERAN frequencies, a band class of CDMA2000 HRPD, or a band class of CDMA2000 1×RTT.

Qoffset$_{s,n}$: Specifies an offset value between two cells.

Qoffset$_{frequency}$: Specifies a frequency specific offset for the E-UTRAN having the same priority.

$Q_{hyst}$: Specifies a hysteresis value for a rank index.

$Q_{qualmin}$: Specifies a minimally required quality level and specified by the unit of dB.

$Q_{rxlevmin}$: Specifies a minimally required Rx level and specified by the unit of dB.

Treselection$_{EUTRA}$: Specifies the cell reselection timer value for the E-UTRAN and may be configured with respect to each frequency of the E-UTRAN.

Treselection$_{UTRAN}$: Specifies the cell reselection timer value for the UTRAN.

Treselection$_{GERA}$: Specifies the cell reselection timer value for the GERAN.

Treselection$_{CDMA\_HRPD}$: Specifies the Cell Reselection Timer Value for the CDMA HRPD.

Treselection$_{CDMA\_1 \times RTT}$: Specifies the cell reselection timer value for the CDMA 1×RTT.

Thresh$_{x,\ HighP}$: An Srxlev threshold value used by the terminal when reselection to an RAT/frequency having a higher priority than a serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,\ HighQ}$: An Squal threshold value used by the terminal when reselection to the RAT/frequency having the higher priority than the serving frequency is specified by the unit of dB. Specific threshold values may be individually configured with respect to each frequency of the E-TRAUN and the UTRAN FDD.

Thresh$_{x,LowP}$: The Srxlev threshold value used by the terminal when reselection to an RAT/frequency having a lower priority than the serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,\ LowQ}$: The Squal threshold value used by the terminal when reselection to the RAT/frequency having the lower priority than the serving frequency is specified by the unit of dB. Specific threshold values may be individually configured with respect to each frequency of the E-TRAUN and the UTRAN FDD.

Thresh$_{Serving,\ LowP}$: The Srxlev threshold value used by the terminal on the serving cell when reselection to the lower RAT/frequency is specified by the unit of dB.

Thresh$_{Serving,\ LowQ}$: The Squal threshold value used by the terminal on the serving cell when reselection to the lower RAT/frequency is specified by the unit of dB.

S$_{IntraSerachP}$: An Srxlev threshold value for intra-frequency measurement is specified by the unit of dB.

S$_{IntraSerachQ}$: An Squal threshold value for intra-frequency measurement is specified by the unit of dB.

S$_{nonIntraSerachP}$: An Srxleve threshold value for E-UTRAN intra-frequency and inter-RAT measurement are specified by the unit of dB.

S$_{nonIntraSerachQ}$: An Squal threshold value for E-UTRAN intra-frequency and inter-RAT measurement are specified by the unit of dB.

Meanwhile, the aforementioned cell reselection parameter may be scaled according to mobility of the terminal. The mobility of the terminal may be estimated based on the number of times when the terminal moves through cell reselection and/or handover during a specific time interval and this is referred to as mobility state estimation (MSE). The mobility of the terminal may be estimated as one of a normal mobility state, a medium mobility state, and a high mobility state according to the MSE.

A parameter which may be used as a reference for estimating the mobility state of the terminal in the MSE may be provided. T$_{CRmax}$ specifies a specific time interval for counting moving execution of another terminal. N$_{CR\_H}$ indicates the maximum number of times of cell reselection for entering the high mobility. N$_{CR\_M}$ indicates the maximum number of times of cell reselection for entering the medium mobility. T$_{CRmaxHyst}$ specifies an additional time interval before the terminal may enter the general mobility state.

A terminal that is in an RRC_IDLE state performs the cell reselection when a cell reselection condition is satisfied. When the number of times at which the terminal performs the cell reselection for T$_{CRmax}$ is more than N$_{CR\_H}$ which is a first threshold value, a condition of the high mobility state is satisfied as the mobility state of the terminal. When the number of times at which the terminal performs the cell reselection for T$_{CRmax}$ is more than N$_{CR\_M}$ which is a second threshold value and not more than N$_{CR\_H}$ which is the first threshold value, a condition of the medium mobility state is satisfied as the mobility state of the terminal. When the number of times when the terminal performs the cell reselection for T$_{CRmax}$ is not more than N$_{CR\_M}$ which is the second threshold value, a condition of the normal mobility state is satisfied as the mobility state of the terminal. For example, when it is not sensed that the terminal is in the high mobility state and the normal mobility state during an additional time interval T$_{CRmaxHyst}$, it may be estimated that the terminal is in the normal mobility state. However, when the terminal performs the cell reselection consecutively between two same cells, the cell reselection may not be counted as the number of cell reselection times.

A scaling factor may be specified according to the mobility state of the terminal according to the MSE and the scaling factor may be applied to one or more cell reselection parameters. For example, sf-Medium and sf-High which are scaling factors according to the medium mobility and the high mobility may be applied to Qhyst, Treselection$_{EUTRA}$, Treselection$_{UTRA}$, Treselection$_{GERA}$, Treselection$_{CDMA\_HRPD}$, and Treselection$_{CDMA\_1 \times RTT}$.

Meanwhile, the cell reselection information may be provided to the terminal while being included in an RRC disconnection message which is an RRC message for RRC disconnection between the network and the terminal. For example, the RRC disconnection message may include a subcarrier frequency list and the cell reselection priority of the E-UTRAN, a subcarrier frequency list and the cell reselection priority of the UTRA-FDD, a subcarrier frequency list and the cell reselection priority of the UTRA-TDD, a subcarrier frequency list and the cell reselection priority of the GERAN, the band class list and the cell reselection priority of the CDMA2000 HRPD, and the band class list and the cell reselection priority of the CDMA2000 1×RTT.

Hereinafter, sharing an RAN by multiple operators will be described.

The multiple operators may provide the service by individually constructing the RAN, but provide the service to a subscriber by sharing a cell constructed by a specific operator. This is referred to as RAN sharing. In this case, the cell shared by the multiple providers may broadcast a PLMN list. The PLMN list may be transmitted while being included in SIB1 of the system information broadcasted by the cell. Meanwhile, a PLMN identifier first listed in the PLMN list included in the SIB1 may be implemented to indicate a primary PLMN.

Under a situation in which one cell is shared by the multiple operators, the cell reselection information provided by the shared cell may be commonly applied to all PLMNs in the PLMN list. In general, the cell reselection information provided by the shared cell is configured to primarily coincide with a policy of the primary PLMN. Therefore, terminals receiving a service depending on a secondary PLMN perform the cell reselection based on information other than the cell reselection information optimized for providing the service.

Hereinafter, the handover related with movement of the terminal in the RRC connection state will be described.

Figure 7:
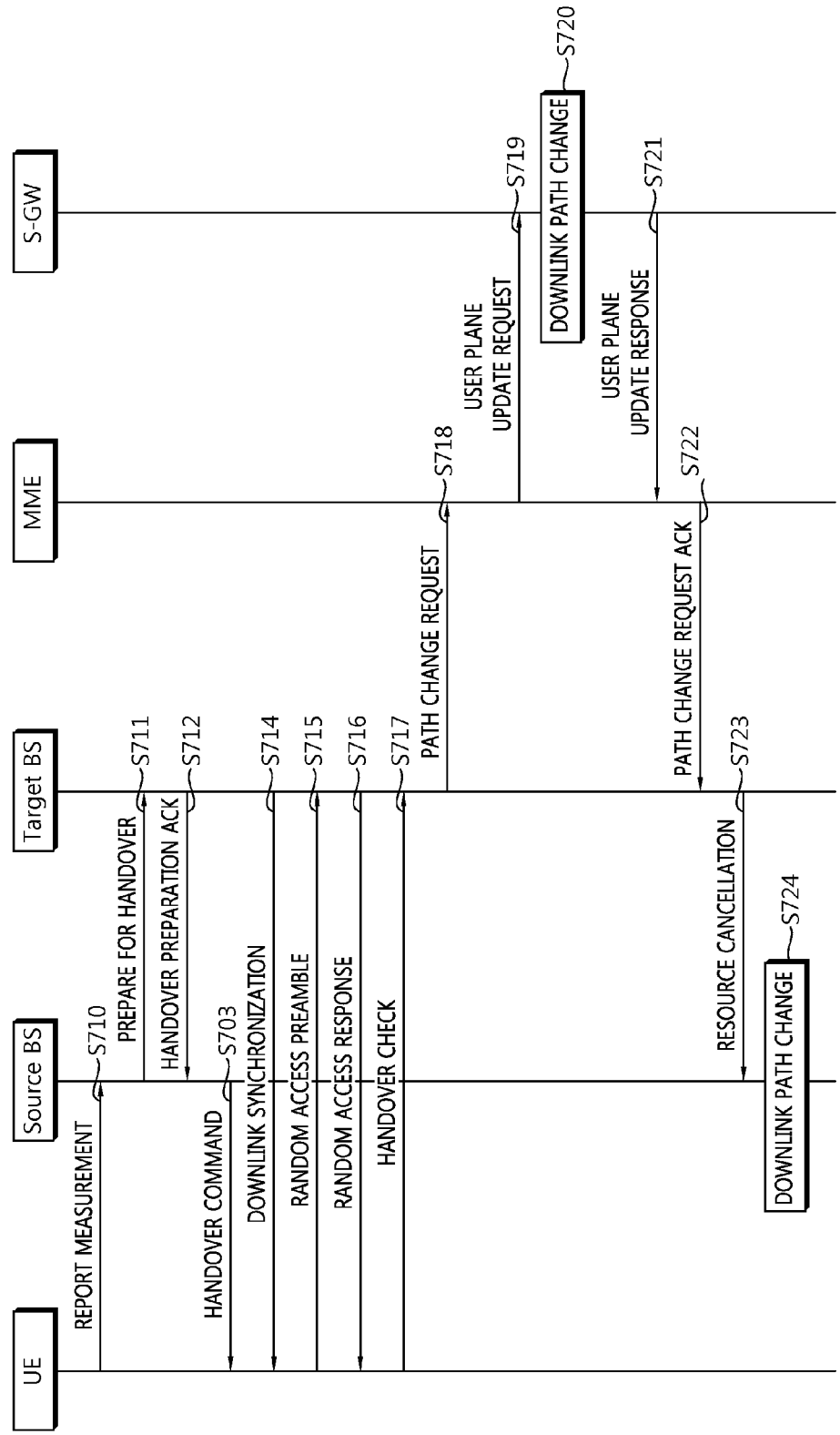
FIG. 7 is a flowchart illustrating a handover process.

FIG. 7 is a flowchart illustrating a handover process.

The terminal (UE) transmits a measurement report to a source base station (BS) (S710). The source base station decides whether to perform the handover by using the received measurement report. When the source base station decides the handover to a contiguous cell, the continuous cell becomes a target cell and a base station that belongs to the target cell becomes a target base station (BS).

The source base station transmits a handover preparation message to the target base station (S711). The target base station performs admission control in order to increase a success possibility of the handover.

The target base station transmits a handover preparation acknowledgement (ACK) message to the source base station (S712). The handover preparation acknowledgement (ACK) message may include a cell-radio network temporary identifier (C-RNTI) and/or a dedicated random access preamble. The C-RNTI is an identifier for identifying the terminal in the cell. The dedicated random access preamble as a preamble which the terminal may exclusively use during a predetermined period is used in performing the non-contention based random access. The random access process may be divided into a contention based random access process using the predetermined random access preamble and the non-contention based random access process using the dedicated random access preamble. The non-contention based random access process may prevent a delay of the handover due to contention with other terminals as compared with the contention based random access process.

The source base station transmits a handover command message to the terminal (S713). The handover command message may be transmitted in a form of a radio resource control (RRC) connection reconfiguration message. The handover command message may include the C-RNTI and the dedicated random access preamble received from the target base station.

The terminal receives the handover command message from the source base station and thereafter, synchronizes with the target base station (S714). The terminal receives a PSS and an SSS of the target base station to synchronize the PSS and the SS and receives the PBCH to acquire the system information.

The terminal transmits the random access preamble to the target base station to start the random access process (S715). The terminal may use the dedicated random access preamble included in the handover command message. Alternatively, if the dedicated random access preamble is not allocated, the terminal may use a predetermined random access preamble selected in a random access preamble set.

The target base station transmits a random access response message to the terminal (S716). The random access response message may include uplink resource allocation and/or time offset (timing advance).

The terminal that receives the random access response message adjusts uplink synchronization based on the time offset and transmits a handover confirm message to the target base station by using the uplink resource allocation (S717). The handover confirm message may indicate that the handover process is completed and be transmitted together with an uplink buffer status report.

The target base station transmits a path switch request message to a mobility management entity (MME).

The MME transmits a user plane update request message to a serving-gateway (S-GW) (S719).

The S-GW switches a downlink data path to the target base station (S720).

The S-GW transmits a user plane update response message to the MME (S721).

The MME transmits a path switch request ACK message to the target base station (S722).

The target base station transmits a resource release message to the source base station to notify the success of the handover (S723).

The source base station release a resource related to the terminal (S724).

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
  a case where the UE determines that there is a serious problem in the downlink communication link quality based on the radio quality measuring result of the PHY layer (determines that the quality of the PCell is low during the RLM.
  a case where the UE determines that there is a problem in the uplink transmission when a random access procedure is continuously failed in a MAC sub-layer.
  a case where the UE determines that there is a problem in the uplink transmission when uplink data transmission is continuously failed in an RLC sub-layer.
  a case where the UE determines that the handover is failed.
  a case where a massage received by the UE does not pass through an integrity check.

Hereinafter, the RRC connection re-establishment procedure will be described in more detail.

Figure 8:
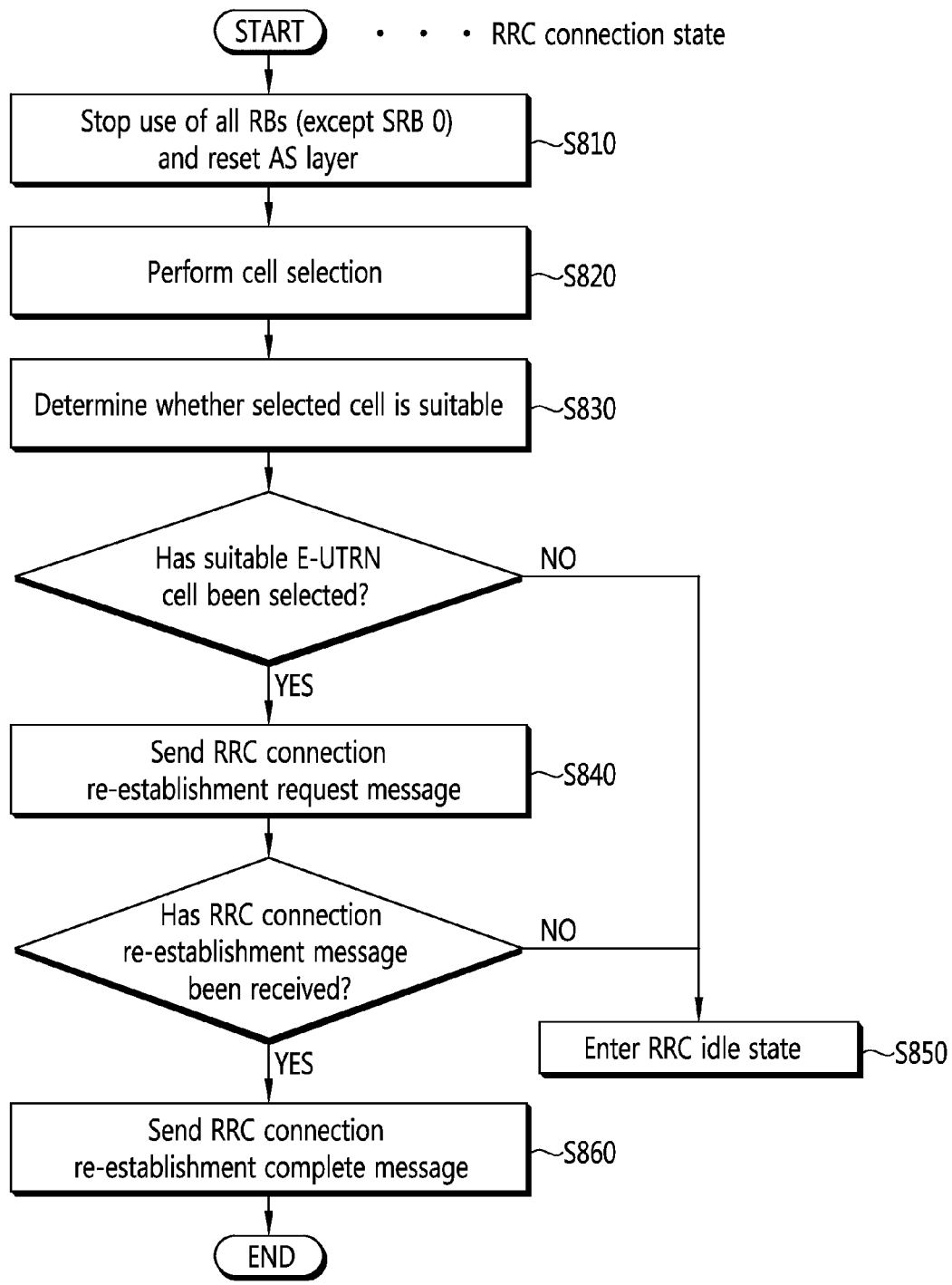
FIG. 8 is a diagram illustrating a RRC connection re-establishment procedure.

FIG. 8 is a diagram illustrating a RRC connection re-establishment procedure.

Referring to FIG. 8, the UE stops the used of all radio bearers which have been set except for signaling radio bearer #0 (SRB 0) and initializes each sub-layer of the AS (S810). Further, each sub-layer and the PHY layer are set as a default configuration. The UE maintains the RRC connection state during such a process.

The UE performs a cell selection procedure for performing the RRC connection reconfiguration procedure (S820). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S830). When it is determined that the selected cell is the suitable E-UTRAN cell, the UE transmits an RRC connection reestablishment request message to the corresponding cell (S840).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S850).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S860).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, interworking between the 3GPP based access network and another access network will be described.

In the 3GPP, access network discovery and selection functions (ANDSF) for discovering and selecting an accessible access network while introducing interworking with a non-3GPP access network (e.g., WLAN) from Rel-8 is standardized. The ANDSF may transfer access network discovery information (e.g., WLAN, WiMAX positional information, and the like) which is accessible at a location of the terminal, inter-system mobility policies (ISMP) to reflect a policy of a provider, and an inter-system routing policy (ISRP) and the terminal may determine IP traffic to be transmitted and an access network to be passed through based on the information. The ISMP may include a network selection rule regarding that the terminal selects one active access network connection (for example, WLAN or 3GPP). The ISRP may include a network selection rule regarding that the terminal selects one or more potential active access network connections (for example, both WLAN or 3GPP). The inter-system routing policy includes multiple access PDN connectivity (MAPCON), IP flow mobility (IFOM), and non-seamless WLAN offloading. Open mobile alliance device management, or the like is used for dynamic provision between the ANDSF and the terminal.

The MAPCON is configured by standardizing a technology that configures and maintains simultaneous multiple PDN connectivity via the 3GPP access network and the non-3GPP access network and enables seamless traffic offloading whole active PDN connection unit seamless traffic offloading. To this end, an ANDSF server provides information on an access point name (APN) that will perform offloading, a priority (routing rule) between the access networks, a time (time of day) to which an offloading method is applied, and information on an access network (validity area) to be offloaded.

The IFOM supports more flexible and subdivided IP flow mobility and seamless offloading than the MAPCON. A technical feature of the IFOM enables the terminal to access the packet data network through different access networks even when being connected to the packet data network by using the same access point name (APN) and enables the mobility and offloading units to move to not the packet data network (PDN) but a specific service IP traffic flow unit to acquire flexibility in service providing. To this end, the ANDSF server provides information on an IP flow that will perform the offloading, the priority (routing rule) between the access networks, the time (time of day) to which the offloading method is applied, and the information on the access network (validity area) to be offloaded.

Non-seamless WLAN offloading represents a technology that does not change a path of predetermined specific IP traffic to the WLAN but completely offloads traffic so as not to pass through an EPC. Since this is not anchored to a P-GW for supporting the mobility, the offloaded IP traffic may not seamlessly to the 3GPP access network again. To this end, the ANDSF server provides information similar to information provided to perform the IFOM to the terminal.

Figure 9:
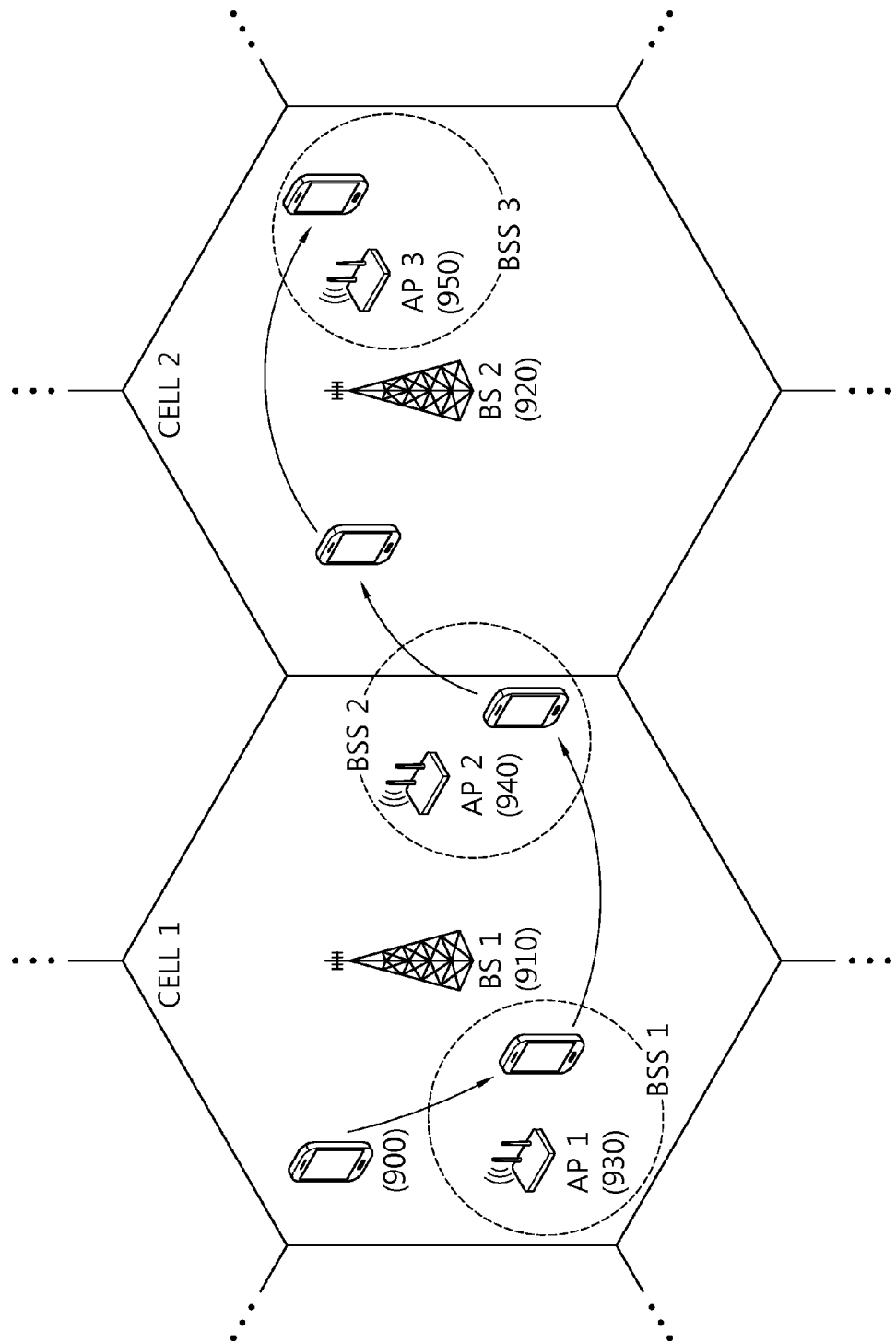
FIG. 9 is a diagram illustrating an example of an environment in which the 3GPP access network and the WLAN access network coexist.

FIG. 9 is a diagram illustrating an example of an environment in which the 3GPP access network and the WLAN access network coexist.

Referring to FIG. 9, as the 3GPP access network, cell 1 in which base station 1 910 is centered and cell 2 in which base station 2 920 is centered are extended. Further, as the WLAN access network, basic service set (BSS) 1 in which an access point (AP)1 930 positioned in the cell 1 is centered and BSS2 in which an AP2 940 is centered are extended and BSS3 in which AP3 950 that exists in cell 2 is centered are extended. Coverage of the cell is illustrated by a solid line and coverage of the BSS is illustrated by dotted lines.

It is assumed that a terminal 900 is configured to perform communication through the 3GPP access network and the WLAN access network. In this case, the terminal 900 may be called a station.

Initially, the terminal 900 establishes connection with the BS1 910 in the cell 1 to perform traffic processing through the 3GPP access network.

The terminal 900 may enter coverage of the BSS1 while moving in coverage of cell 1 and discover the BSS1 through scanning. In this case, the terminal 900 may be connected with the WLAN access network by performing association and authentication procedures with the AP1 930 of the BSS1. As a result, the terminal 900 may process the traffic through the 3GPP access network and the WLAN access network. Meanwhile, when the terminal 900 moves to deviate from the coverage of the BSS1, connection with the WLAN access network may end.

The terminal 900 continuously moves in the coverage of the cell 1 to move to the vicinity of a boundary between the cell 1 and the cell 2 and enters the coverage of the BSS2 to discover the BSS2 through scanning. In this case, the terminal 900 may be connected with the WLAN access network by performing the association and authentication procedures with the AP2 940 of the BSS2. Meanwhile, since the terminal 900 in the coverage of the BSS2 is positioned on the boundary of the cell 1 and the cell 2, service quality through the 3GPP access network may not be excellent. In this case, the terminal 900 may operate to concentratively process the traffic through the WLAN access network.

When the terminal 900 moves to deviate from the coverage of the BSS2 and enters the center of the cell 2, the terminal 900 may terminate the connection with the WLAN access network and process the traffic through the 3GPP access network based on the cell 2.

The terminal 900 may enter the coverage of the BSS3 while moving in the coverage of cell 2 and discover the BSS1 through scanning. In this case, the terminal 900 may be connected with the WLAN access network by performing the association and authentication procedures with the AP3 950 of the BSS3. As a result, the terminal 900 may process the traffic through the 3GPP access network and the WLAN access network.

As described in the example of FIG. 9, under a wireless communication environment in which the 3GPP access network and the non-3GPP access network coexist, the terminal may adaptively process the traffic through the 3GPP access network and/or the non-3GPP access network.

One of primary objects of performing interworking is to control the load of the access network by offloading the traffic. To this end, the base station may move some terminals among terminals which establish the RRC connection to another access network according to a load level of the CN. Therefore, the base station may decide a load control level of the network and easily control the load.

Meanwhile, in the interworking between the 3GPP access network and the non-3GPP access network in the related art, the terminal selects a specific access network according to the ANDSF policy and processes the traffic through the selected access network. In this case, the base station may not control the interworking between the 3GPP access network and the non-3GPP access network. Therefore, the radio resource is not normally allocated to terminals that receive the service in the cell to cause a problem in that the quality of service (QoS) of the terminals deteriorates.

A traffic routing criterion needs to be provided to the terminal in order for the terminal to process the traffic through the non-3GPP access network suitable for traffic routing. Further, the base station needs to acquire information on the non-3GPP access network around the terminal and determine whether the traffic processing through the non-3GPP access network is appropriate in order to control the interworking between the access networks.

By such a point, the present invention proposes a method in which the terminal receives the traffic routing criterion from the base station and performs traffic routing evaluation for traffic routing to the non-3GPP access network. Further, in the embodiment of the present invention, the traffic routing evaluation may be used to route the traffic to the non-3GPP access network to the 3GPP access network. In addition, proposed is a communication method in which the terminal provides information on a result of the traffic routing evaluation to the base station to allow the 3GPP access network and/or the non-3GPP access network such as the base station and the AP to control the processing the 3GPP traffic/non-3GPP traffic through the traffic routing.

Hereinafter, in describing the communication method that provides setting the traffic routing criterion, it will be described that the non-3GPP access network is the WLAN access network as an example. However, the scope of the present invention is not limited thereto and may be applied even to communication of the terminal associated with other access networks.

Figure 10:
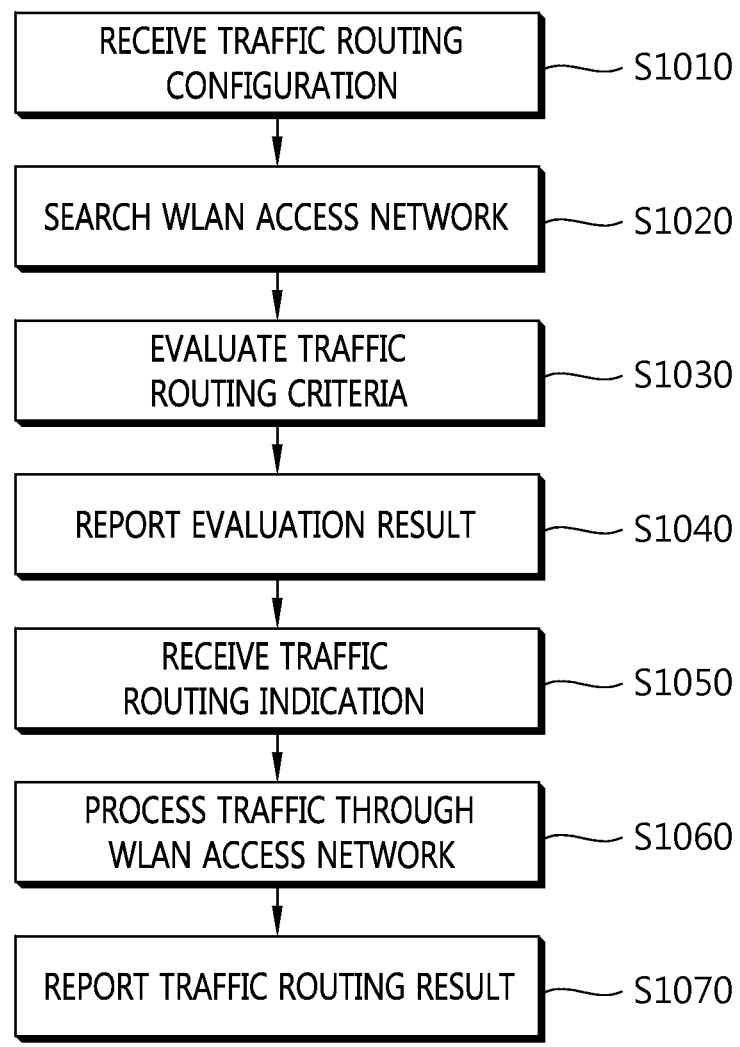
FIG. 10 is a diagram illustrating a communication method according to an embodiment of the present invention.

FIG. 10 is a diagram illustrating an example of a communication method according to an embodiment of the present invention.

Referring to FIG. 10, the terminal receives a traffic routing configuration (S1010). The traffic routing information may be transmitted from the 3GPP access network.

The traffic routing configuration may be provided to the terminal through the broadcast signaling from the 3GPP access network. For example, the traffic routing configuration may be transmitted while being included in the system information broadcasted by the 3GPP access network.

The traffic routing configuration may be provided to the terminal through the dedicated signaling from the 3GPP access network. For example, the traffic routing configuration may be transmitted while being included in the RRC message.

The traffic routing configuration may specify the traffic routing criterion. The traffic routing criterion may define one or more routing events and parameters associated with the routing events. The terminal may perform the traffic routing evaluation based on the routing criterion and decide whether to report the evaluation result.

The traffic routing configuration may include a concerned WLAN list. The concerned WLAN list may include one or more concerned WLANs. Herein, the concerned WLAN may mean a WLAN access network entity in which the 3GPP traffic processing is considered to be potentially permitted. The concerned WLAN list may be constituted by one or more concerned WLAN identifiers and the identifiers which may be included in the concerned WLAN list will be described below.

1) WLAN SSID (Service Set Identifier): The WLAN SSID may be duplicatively used in a plurality of BSSs.

2) WLAN BSSID (Basic Service Set Identifier): The WLAN BSSID as information for identifying a BSS managed by a specific AP may be generally set as an MAC address of the corresponding AP.

3) HESSID (Homogeneous Extended Service Set Identifier): The HESSID as the same value as one BSSID among APs and an identifier set by a hotspot operator may be set in the form of the MAC address. All APs in a hotspot network may be set the same HESSID value.

4) Domain name list: The domain name list may include one or more domain names of the WLAN access network entity.

The traffic routing configuration may include priority information regarding the concerned WLAN included in the concerned WLAN list. The priority information may indicate a priority with which the terminal preferentially performs the traffic routing evaluation and accesses with respect to one or more concerned WLANs included in the concerned WLAN list. That is, the terminal may attempt the traffic routing evaluation for a concerned WLAN having a highest priority among the discovered WLANs. The priority information may be implemented not as separate information but as the order of identifiers arranged in the concerned WLAN list. A concerned WLAN at an identifier arranged earlier may have a higher priority or otherwise.

The traffic routing configuration may include one or more routing events. Each routing event may specify a detailed condition for the traffic routing evaluation. The traffic routing event may be implemented as follows. The traffic routing criterion may be configured by one or more combinations of routing events described below.

1) The discovered WLAN access network entity is included in the concerned WLAN list of the traffic routing configuration.

2) The signal quality of the discovered WLAN access network entity is higher than a specific quality threshold value.

3) The load level of the discovered WLAN access network is lower than a specific load threshold value.

4) The speed of the backhaul link associated with the discovered WLAN access network is higher than a specific speed threshold value. The backhaul link may be a distribution system (DS). The speed of the backhaul link may be an uplink traffic processing speed of the DS and/or a downlink traffic processing speed of the DS.

The traffic routing configuration may include additional information which may be used to evaluate whether the traffic routing criterion depending on the routing event is satisfied. For example, the traffic routing configuration may include at least one of the quality threshold value, the load threshold value, and the speed threshold value.

In the traffic routing criterion specified by the traffic routing configuration, the routing event for the concerned WLAN list may be particularly be implemented to be included in the traffic routing criterion.

When the WLAN signal transmitting and receiving functions are not activated, the terminal that receives the traffic routing configuration may operate to enable WLAN communication by activating the corresponding functions.

The terminal that receives the traffic routing configuration may performs searching the WLAN access network (S1020). Searching the WLAN access network may be an operation in which the terminal discovers contiguous WLAN access network entities by performing the scanning. The scanning performed by the terminal may be performed according to passive scanning and/or active scanning defined in the WLAN.

According to the passive scanning, the terminal may discover the WLAN access network entity through receiving a beacon frame transmitted from the WLAN access network entity. The terminal may discover an AP and/or a non-AP station that transmits the beacon frame. All or some of the WLAN system information are included in the probe response frame transmitted from the AP and/or the non-AP station. In more detail, as the identification information for the WLAN access network entity for the corresponding AP and/or the non-AP station, the BSSID, the SSID, the HESSID, and the like may be included in the beacon frame. Further, the capability information which may be supported by the WLAN access network entity may be included in the beacon frame.

According to the active scanning, the terminal may transmit a probe request frame. The probe request frame may be transmitted in a broadcast scheme. The terminal may receive a probe response frame from a specific WLAN access network entity as a response to the probe request frame and discover the corresponding WLAN access network entity. The terminal may discover an AP and/or a non-AP station that transmits the probe response frame. All or some of the WLAN system information are included in the probe response frame transmitted from the AP and/or the non-AP station. In more detail, as identification information for the WLAN access network entity for the corresponding AP and/or the non-AP station, the BSSID, the SSID, the HESSID, and the like may be included in the probe response frame. Further, capability information which may be supported by the WLAN access network entity may be included in the probe response frame.

The terminal performs the traffic routing criterion evaluation for the discovered WLAN access network entity (S1030). The terminal may perform the evaluation based on the traffic routing criterion configured in the terminal through the traffic routing configuration. In more detail, the terminal may determine whether one or more routing events provided through the traffic routing configuration for the traffic routing criterion evaluation is satisfied.

When the traffic routing criterion is specified by a plurality of routing events, the terminal may decide that the traffic routing criterion is satisfied when one of the plurality of routing events is satisfied. Alternatively, when the traffic routing criterion is specified by the plurality of routing events, the terminal may decide that the traffic routing criterion is satisfied when all of the plurality of routing events are satisfied.

For example, as described above, the traffic routing configuration may be implemented so that the routing event for the concerned WLAN list is requisitely included in the traffic routing criterion. In this case, the terminal may preferentially determine whether the discovered WLAN access network is included in the concerned WLAN list. As a result of the determination, the terminal may determine whether the traffic routing criterion is satisfied according to residual routing vents for the WLAN access network that is confirmed that the WLAN network is included in the WLAN list. When configured conditions according to all routing events are satisfied, the terminal may decide that the corresponding WLAN access network satisfies the traffic routing criterion.

The terminal reports a traffic routing criterion evaluation result (S1040). The evaluation result may be reported to the 3GPP access network through a specific RRC message. The RRC message may be a terminal information reporting message.

The evaluation result may include at least one of information described below.

1) Identifiers of one or more WLAN access network entities that satisfy the traffic routing criterion 2) WLAN channel information of one or more WLAN access network entities that satisfy the traffic routing criterion Herein, the channel corresponds to a physical medium having a specific frequency band and a specific bandwidth unlike a channel discussed in the 3GPP access network and hereinafter, the channel will be referred to as a WLAN channel for distinguishing from the channel in the 3GPP access network.

3) Presence of traffic to be routed and processed to the WLAN access network

4) Information on the traffic which may be routed and processed to the WLAN access network. Meanwhile, a type of the traffic which may be processed through routing may be as follows.

Best effort traffic (e.g., non-delay traffic such as Internet traffic other than a real-time game requiring VoIP or a stringent delay budget)

Traffic which is serviced on a specific CQI depending on a network configuration such as signaling of a QoS class identifier (QCI) list or predetermined QCI values Traffic that belongs to a specific APN by a network configuration OR such as a predetermined APN Information on the traffic type may be implemented as a list including a radio bearer identifier associated with the corresponding traffic.

After the traffic routing criterion evaluation for all of the discovered WLAN access network ends, the terminal may report the evaluation result to the 3GPP access network. In this case, information on one or more WLAN access network entities may be included in the evaluation result. For example, when the plurality of WLAN access network entities satisfy the traffic routing criterion, a plurality of WLAN access network entities may be included in the evaluation result.

Alternatively, when the discovered specific WLAN access network entity satisfies the traffic routing criterion, the terminal may report an evaluation result associated with the corresponding entity to the 3GPP access network. In this case, information on the corresponding WLAN access network entity may be included in the evaluation result. An entity which is discovered but not yet subjected to the traffic routing criterion may be evaluated when traffic routing to the WLAN access network entity that triggers the evaluation result reporting is not instructed.

The 3GPP access network that receives the evaluation result may decide whether the traffic routing instruction is routed to the terminal. The 3GPP access network may decide whether the WLAN access network entity is appropriate to the traffic routing and/or whether the traffic type is appropriate to the routing based on the information included in the evaluation result. Further, when the 3GPP access network receives a report of the evaluation result including the plurality of WLAN access network entities, the 3GPP access network may select a specific entity for the traffic routing and notify the selected specific entity to the terminal through the traffic routing instruction. As a result, the 3GPP access network may transmit the traffic routing instruction to the terminal. The traffic routing instruction may include the following information.

1) Target WLAN information (e.g., the WLAN identifier lists (including BSSID, SSID, HESSID, and the like) indicating the network entity for which the terminal will process the traffic by routing the 3GPP traffic. When no WLAN identifier is included in the target WLAN information, the traffic processing through the WLAN access network entity received through the reporting result is not permitted.

2) Traffic information indicating traffic which is permitted to be routed to a routing target entity Similarly, the traffic information may indicate which traffic routing is required and in this case, the indication of the traffic may be performed through the radio bearer identifier. The traffic information may be configured to instruct to route and process all traffic to the WLAN access network. When the traffic information includes no radio bearer identifier, that is, when the traffic information indicates no traffic, it may be indicated that the traffic routing is not permitted.

3) Information instruct to release the RRC connection after all traffic is routed and processed 4) Information on a WLAN in which the traffic routing is permitted and/or not permitted.

5) Information on a traffic routing direction indicating whether the traffic routing is performed to the WLAN entity from the 3GPP access network and/or whether the traffic routing is performed to the 3GPP access network from the WLAN entity The 3GPP access network transmits the traffic routing indication including the information and receives the traffic routing indication (S1050). When the traffic routing indication indicates that the routing is not permitted or when the terminal may not receive the traffic routing indication within a specific time, the terminal may start discovering a new WLAN access network entity or perform the traffic routing criterion evaluation for the residual discovered WLAN access network entities.

The terminal that receives the traffic routing indication processes the traffic through the WLAN access network based on the traffic routing indication (S1060).

The terminal may access the WLAN access network entity indicated by the traffic routing indication. The terminal's access to the concerned WLAN access network entity may include performing the association and authentication procedures with the corresponding AP. The association procedure may be performed as the terminal transmits the association request frame to the WLAN access network entity and receives the association response frame from the AP as a response thereto. The authentication procedure may be performed through transmission/reception of an authentication frame between the terminal and the WLAN access network entity.

The terminal processes the traffic indicated to be processed by the traffic routing indication through the WLAN access network. When the traffic routing indication indicates that all traffic is routed and processed, the terminal may route and process traffic for all established radio bearers to the accessed WLAN access network.

Meanwhile, when traffic routing direction information indicating that the WLAN traffic is processed through the 3GPP access network by the traffic routing indication is included, the terminal may process the WLAN traffic through the 3GPP access network. When the RRC connection is not established through the 3GPP access network, the terminal may perform an RRC connection establishment and reestablishment procedure. Meanwhile, when the terminal starts processing the WLAN traffic through the 3GPP access network or the processing is completed, the terminal may cancel association with the WLAN.

The terminal may report a traffic routing result to the 3GPP access network. The traffic routing result may indicate whether the terminal success in attempting the traffic routing.

When the terminal accesses the WLAN access network and processes all indicated traffic, the terminal may transmit a traffic routing result message indicating that the traffic routing is successful to the 3GPP access network.

When the terminal accesses the WLAN access network, but may not process all indicated traffic, the terminal may transmit the traffic routing result message indicating that the traffic routing is unsuccessful to the 3GPP access network. In more detail, the traffic routing result message may be configured to indicate that the authentication and association for the WLAN access network is successful, but the traffic processing is unsuccessful.

When the terminal fails to access the WLAN access network not to process the traffic, the terminal may transmit the traffic routing result message indicating that accessing the WLAN access network is unsuccessful to the 3GPP access network. In more detail, the traffic routing result message may be configured to indicate the authentication or association.

When the 3GPP access network receives the traffic routing result indicating that the traffic routing is successfully completed from the terminal, the 3GPP access network may transfer information indicting the traffic routing result to an MME (alternatively, equivalent core network node). The corresponding information may include at least one of the traffic routing result associated with a change of a radio bearer configuration, and the like and the information indicating the traffic routing target WLAN access network entity.

The MME (alternatively, equivalent core network node) received from the 3GPP access network may request re-route a data flow toward the corresponding 3GPP access network to the traffic routing target WLAN access network entity to the S-GW. The re-routing may be performed by a route switching procedure.

The success or failure of the re-routing may be notified to the MME and notified to the 3GPP access network again. As a result, the 3GPP access network may notify the success or not of the traffic routing procedure to the terminal and this may be implemented by transmitting a traffic routing confirmation message to the terminal.

There is no remaining radio bearer by processing all traffic and the terminal that successfully reports the traffic routing result may release the RRC connection. The RRC connection release may be performed subsequently to reporting the traffic routing result. Alternatively, the traffic routing confirmation message by the 3GPP access network is received as a response to the traffic routing result reporting and the traffic routing confirmation message may be received after confirming that the traffic routing is successfully performed.

The terminal that fails to processing the traffic may process the traffic through the 3GPP access network based on the RRC configuration received before the traffic routing indication. The terminal that already releases the RRC connection may start the RRC connection reestablishment procedure.

Figure 11:
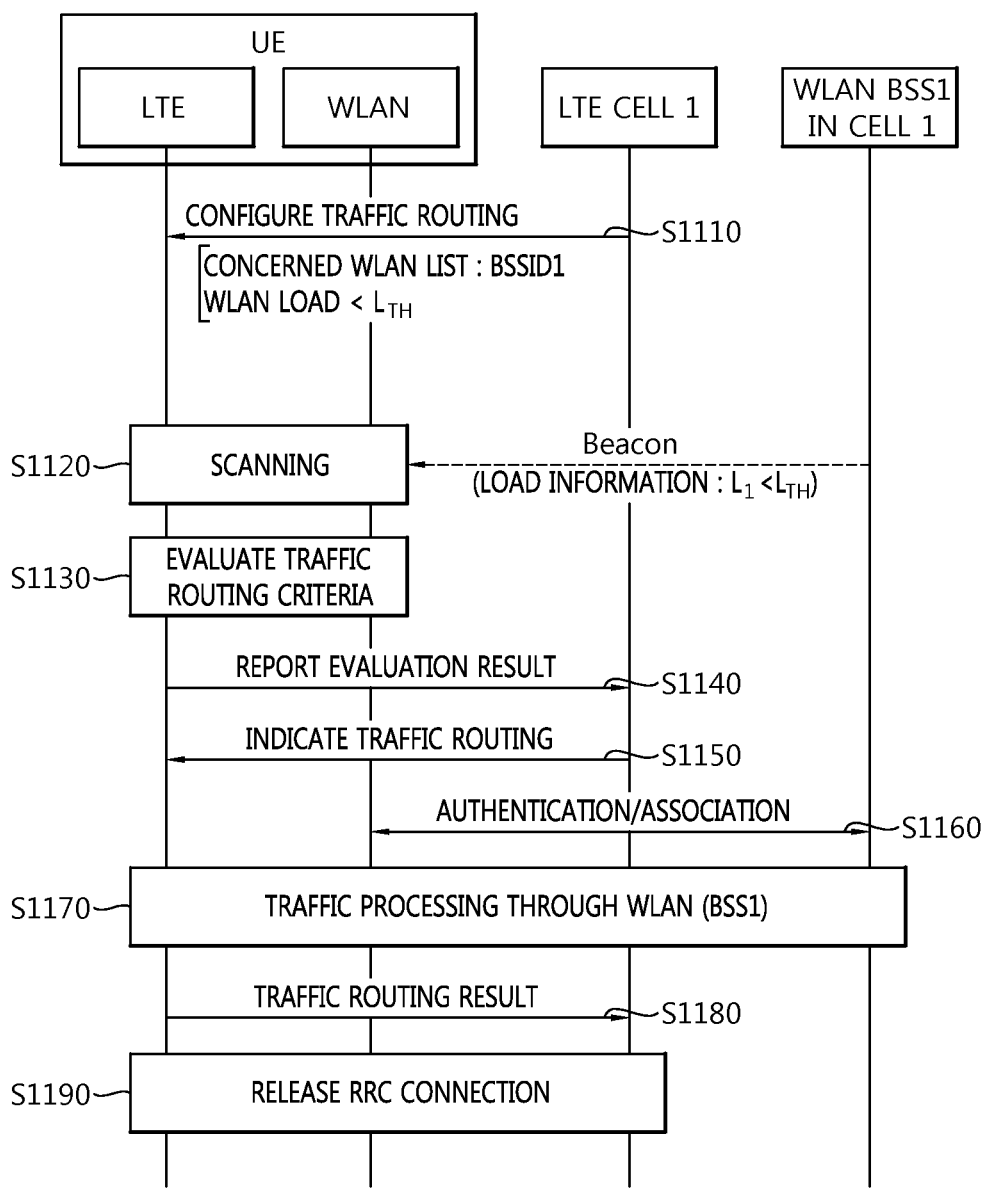
FIG. 11 is a diagram illustrating an example of a communication method according to an embodiment of the present invention.

FIG. 11 is a diagram illustrating one example of a communication method according to an embodiment of the present invention.

Referring to FIG. 11, it is assumed that the terminal supports both communication based on LTE and communication based on the WLAN and it is assumed that the LTE communication and the WLAN communication may be independently performed. It is assumed that the terminal receives the service by establishing connection with cell 1. It is assumed that the BSS1 is extended in the coverage of the cell 1.

The terminal receives the traffic routing configuration from the cell 1 (S1110). The traffic routing configuration specifies the traffic routing criterion for the traffic routing of the terminal. The traffic routing configuration may include a concerned WLAN list and routing events associated with a WLAN load. The concerned WLAN list may include BSSID1.

The terminal performs scanning for searching the concerned WLAN (S1120). The terminal may perform the passive scanning. Through the passive scanning, the terminal receives the beacon frame transmitted from the AP of the BSS1 to discover the BSS1. The BSSID of the BSS1 and the system information for operating the WLAN in the BSS1 may be included in the beacon frame. The load information of the BSS1 may be included in the system information of the beacon frame and the load information may indicate $L_1$ as a load level of the BSS1.

The terminal performs the traffic routing criterion evaluation for the BSS1 (S1130). The terminal may perform the traffic routing criterion evaluation by considering whether the BSS1 corresponds to the concerned WLAN depending on the concerned WLAN list and whether the load level of the BSS1 is lower than a specific load threshold value $L_{TH}$.

The terminal may find that the BSSID1 which is the identifier of the BSS1 discovered through the scanning is included in the concerned WLAN list. Further, it may be found that the load level L1 of the BSS1 is lower than the load threshold value $L_{TH}$ through the load information of the BSS1 acquired through the scanning. Therefore, the terminal may decide that the BSS1 satisfies the traffic routing criterion.

The terminal reports a traffic routing criterion evaluation result to the cell 1 (S1140). The evaluation result may include the identifier of the BSS1. Additionally, the evaluation result may further include the presence of traffic which is permitted to be routed and processed, traffic information associated with the traffic type, and WLAN channel information of the BSS1.

The cell 1 that receives the evaluation result decides whether the traffic routing indication is transmitted and transmits the traffic routing indication to the terminal (S1150). The traffic routing indication may include the identifier of the BSS1 which is the target WLAN access network entity for which the 3GPP traffic is to be processed. Additionally, the traffic routing indication may include information for identifying traffic to be routed and processed to the BSS1. The traffic information may include a radio bearer identifier list. Further, the traffic routing indication may further include information for instructing to release the RRC connection after successful processing of the traffic.

The terminal that receives the traffic routing indication performs the association/authentication procedure to perform the WLAN communication in the BSS1 (S1160). The terminal transmits and receives the authentication frame to and from the AP of the BSS1 and exchanges the association request frame and the association response frame to perform the authentication and association procedures.

The terminal processes the traffic through the AP of the BSS1 (S1170). The terminal may process the 3GPP traffic through the BSS1 as indicated by the traffic routing indication. The terminal may process the traffic indicated by the traffic routing indication through the BSS1 and process residual traffic through the cell 1. Meanwhile, when information on the traffic to be routed and processed by the traffic routing indication is not provided to the terminal, the terminal may process all traffic through the BSS1 or adaptively process some or all of the traffic through the BSS1 according to a service environment in the cell 1 and the BSS1.

The terminal that completes the traffic processing through the BSS1 reports the traffic routing result to the cell 1 (S1180). The traffic routing result may indicate that the traffic indicated by the traffic routing indication and/or all traffic is successfully processed.

The terminal reports the traffic routing result to the cell 1 and thereafter, performs an RRC connection release procedure with the cell 1 (S1190).

Meanwhile, if possible, the terminal may process the traffic through the cell 1 while processing the traffic through the AP of the BSS1. In this case, what degree of traffic among all traffic to process through the WLAN access network may be adaptively decided according to the service environment in the cell 1 and the BSS1.

Figure 12:
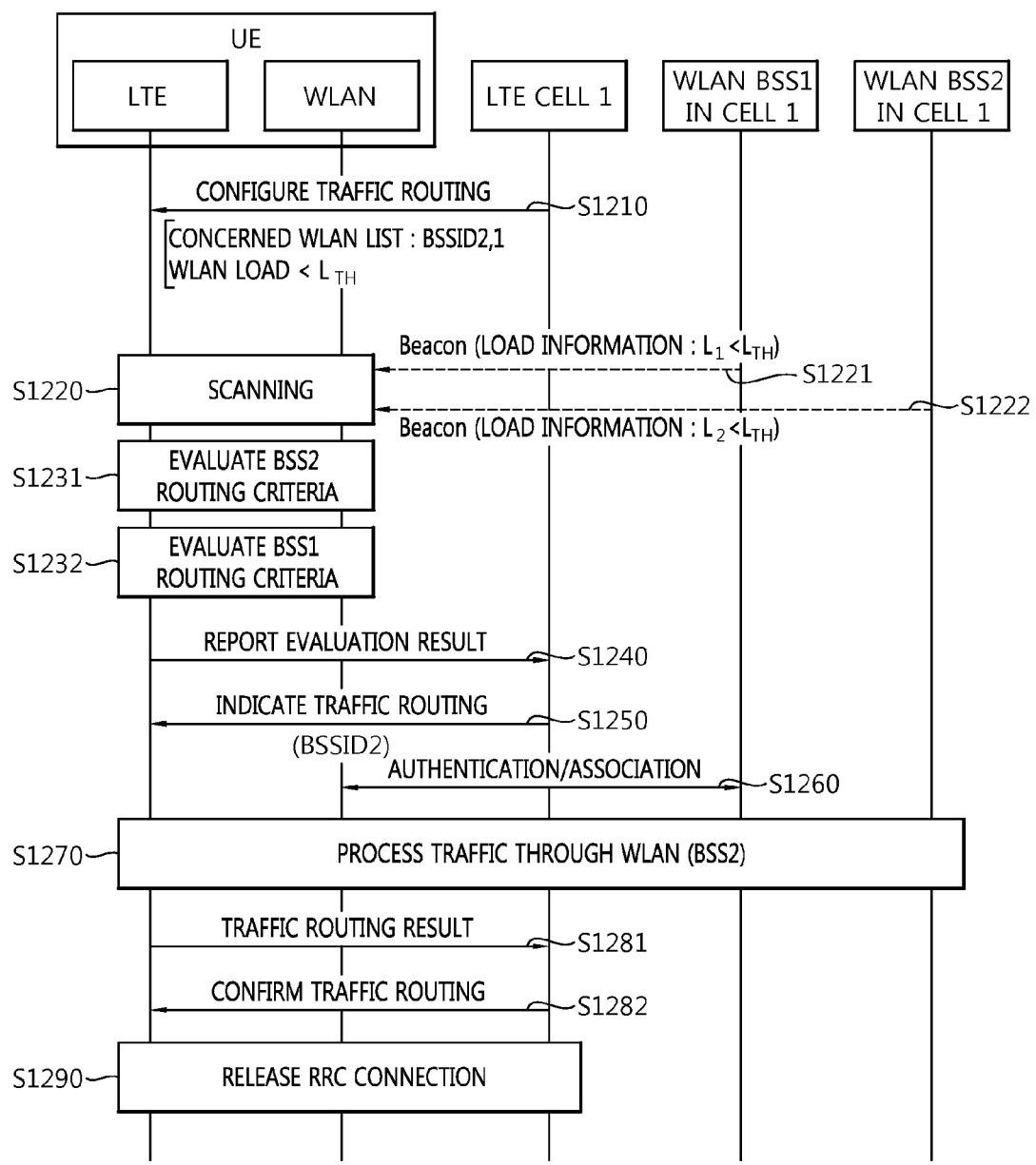
FIG. 12 is a diagram illustrating one example of a communication method according to an embodiment of the present invention.

FIG. 12 is a diagram illustrating another example of the communication method according to the embodiment of the present invention.

Referring to FIG. 12, it is assumed that the terminal supports both the communication based on the LTE and the communication based on the WLAN and it is assumed that the LTE communication and the WLAN communication may be independently performed. It is assumed that the terminal receives the service by establishing connection with cell 1. It is assumed that the BSS1 and the BSS2 are extended in coverage of the cell 1.

The terminal receives the traffic routing configuration from the cell 1 (S1210). The traffic routing configuration specifies the traffic routing criterion for the traffic routing of the terminal. The traffic routing configuration may include a concerned WLAN list and routing events associated with a WLAN load. The concerned WLAN list may include the BSSID2 and the BSSID1. The terminal may find that the BSS2 has a higher priority than BSS2 according to an arrangement order of the BSSID.

The terminal performs scanning for searching the concerned WLAN (S1220). The terminal may perform the passive scanning.

Through the passive scanning, the terminal receives the beacon frame transmitted from the AP of the BSS1 to discover the BSS1 (S1221). The BSSID of the BSS1 and the system information for operating the WLAN in the BSS1 may be included in the beacon frame. The load information of the BSS1 may be included in the system information of the beacon frame and the load information may indicate $L_1$ as the load level of the BSS1.

Through the passive scanning, the terminal receives the beacon frame transmitted from the AP of the BSS2 to discover the BSS2 (S1222). The BSSID of the BSS2 and the system information for operating the WLAN in the BSS2 may be included in the beacon frame. The load information of the BSS2 may be included in the system information of the beacon frame and the load information may indicate $L_2$ as the load level of the BSS2.

The terminal performs the traffic routing criterion evaluation for the BSS2 (S1231). Since the terminal may find that the priority for the BSS2 is high through the concerned WLAN list of the traffic routing configuration, the terminal may preferentially perform the traffic routing criterion evaluation for the BSS2. The terminal may perform the traffic routing criterion evaluation by considering whether the BSS2 corresponds to the concerned WLAN depending on the concerned WLAN list and whether the load level of the BSS2 is lower than a specific load threshold value $L_{TH}$.

The terminal may find that the BSSID2 which is the identifier of the BSS2 discovered through the scanning is included in the concerned WLAN list. Further, it may be found that the load level $L_2$ of the BSS2 is lower than the load threshold value $L_{TH}$ through the load information of the BSS2 acquired through the scanning. Therefore, the terminal may decide that the BSS2 satisfies the traffic routing criterion.

The terminal may be configured not to report the evaluation result immediately even though a specific BSS satisfies the traffic routing criterion and to perform the traffic routing criterion evaluation even with respect to residual BSSs. As a result, the terminal performs the traffic routing criterion evaluation for the BSS1 subsequently to the evaluation of the BSS2 (S1232). The terminal may perform the traffic routing criterion evaluation by considering whether the BSS1 corresponds to the concerned WLAN depending on the concerned WLAN list and whether the load level of the BSS1 is lower than a specific load threshold value $L_{TH}$.

The terminal may find that the BSSID1 which is the identifier of the BSS1 discovered through the scanning is included in the concerned WLAN list. Further, it may be found that the load level L1 of the BSS1 is lower than the load threshold value $L_{TH}$ through the load information of the BSS1 acquired through the scanning. Therefore, the terminal decides that the BSS2 satisfies the traffic routing criterion.

The terminal reports a traffic routing criterion evaluation result to the cell 1 (S1240). The evaluation result may include an evaluation result for the BSS1 and an evaluation result for the BSS2.

The evaluation result may include the identifiers of the BSS1 and the BSS2. Additionally, the evaluation result may further include the presence of traffic which is permitted to be routed and processed, traffic information associated with the traffic type, and WLAN channel information of the BSS1 and BSS2.

The cell 1 that receives the evaluation result decides whether the traffic routing indication is transmitted and transmits the traffic routing indication to the terminal (S1250). The traffic routing indication may include the identifier of the BSS2 which is the target WLAN access network entity for which the 3GPP traffic is be processed. Additionally, the traffic routing indication may include information for identifying traffic to be routed and processed to the BSS2. The traffic information may include the radio bearer identifier list.

The terminal that receives the traffic routing indication performs the association/authentication procedure to perform the WLAN communication in the BSS2 (S1260). The terminal transmits and receives the authentication frame to and from the AP of the BSS2 and exchanges the association request frame and the association response frame to perform the authentication and association procedures.

The terminal processes the traffic through the AP of the BSS2 (S1270). The terminal may process the 3GPP traffic through the BSS2 as indicated by the traffic routing indication. The terminal may process the traffic indicated by the traffic routing indication through the BSS2 and process residual traffic through the cell 1. Meanwhile, when information on the traffic to be routed and processed by the traffic routing indication is not provided to the terminal, the terminal may process all traffic through the BSS2 or adaptively process some or all of the traffic through the BSS2 according to a service environment in the cell 1 and the BSS2.

The terminal that completes the traffic processing through the BSS2 reports the traffic routing result to the cell 1 (S1281). The traffic routing result may indicate that the traffic indicated by the traffic routing indication and/or all traffic is successfully processed.

The cell 1 confirms whether the traffic routing is successfully performed based on the traffic routing result. The cell 1 deciding that the traffic routing is successfully performed transmits traffic routing confirmation to the terminal (S1282).

The terminal that receives the traffic routing confirmation performs the RRC connection release procedure with the cell 1 (S1290).

Figure 13:
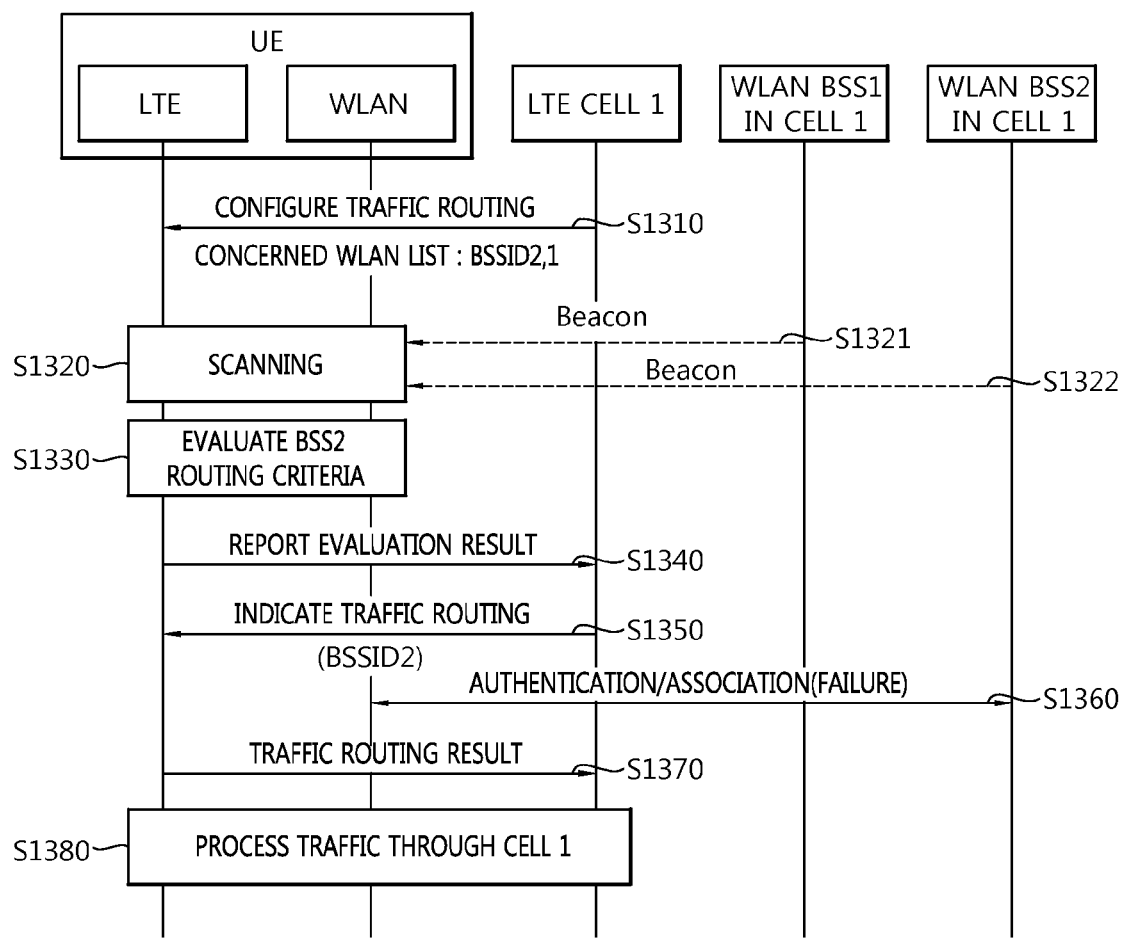
FIG. 13 is a diagram illustrating another example of a communication method according to an embodiment of the present invention.

FIG. 13 is a diagram illustrating yet another example of the communication method according to the embodiment of the present invention.

Referring to FIG. 13, it is assumed that the terminal supports both communication based on LTE and communication based on the WLAN and it is assumed that the LTE communication and the WLAN communication may be independently performed. It is assumed that the terminal receives the service by establishing connection with cell 1. It is assumed that the BSS1 and the BSS2 are extended in coverage of the cell 1.

The terminal receives the traffic routing configuration from the cell 1 (S1310). The traffic routing configuration specifies the traffic routing criterion for the traffic routing of the terminal. The traffic routing configuration may include the concerned WLAN list. The concerned WLAN list may include the BSSID2 and the BSSID1. The terminal may find that the BSS2 has a higher priority than BSS1 according to an arrangement order of the BSSID in the concerned WLAN list.

The terminal performs scanning for searching the concerned WLAN (S1320). The terminal may perform the passive scanning.

Through the passive scanning, the terminal receives the beacon frame transmitted from the AP of the BSS1 to discover the BSS1 (S1321). The BSSID of the BSS1 and the system information for operating the WLAN in the BSS1 may be included in the beacon frame.

Further, the terminal receives the beacon frame transmitted from the AP of the BSS2 to discover the BSS2 (S1322). The BSSID of the BSS2 and the system information for operating the WLAN in the BSS2 may be included in the beacon frame.

The terminal performs the traffic routing criterion evaluation for the BSS2 (S1330). Since the terminal may find that the priority for the BSS2 is high through the concerned WLAN list of the traffic routing configuration, the terminal may preferentially perform the traffic routing criterion evaluation for the BSS2. The terminal may perform the traffic routing criterion evaluation by considering whether the BSS2 corresponds to the concerned WLAN depending on the concerned WLAN list. In this example, since the identifier of the BSS2 discovered through the scanning is included in the concerned WLAN list, the terminal may decide that the BSS2 satisfies the traffic routing criterion.

The terminal may be configured to immediately report the evaluation result even though a specific BSS satisfies the traffic routing criterion evaluation. Therefore, the terminal does not perform the traffic routing criterion evaluation for the BSS1 and reports the traffic routing criterion evaluation result to the cell 1 (S1340). The evaluation result may include the identifier of the BSS2. Additionally, the evaluation result may further include the presence of traffic which is permitted to be routed and processed, traffic information associated with the traffic type, and WLAN channel information of the BSS2.

The cell 1 that receives the evaluation result decides whether the traffic routing indication is transmitted and transmits the traffic routing indication to the terminal (S1350). The traffic routing indication may include the identifier of the BSS2 which is the target WLAN access network entity for which the 3GPP traffic is to be processed. Additionally, the traffic routing indication may include information for identifying traffic to be routed and processed to the BSS2. The traffic information may include the radio bearer identifier list. Further, the traffic routing indication may further include information for instructing to release the RRC connection after successful processing of the traffic.

The terminal that receives the traffic routing indication performs the association/authentication procedure to perform the WLAN communication in the BSS2 (S1360). The terminal transmits and receives the authentication frame to and from the AP of the BSS1 and exchanges the association request frame and the association response frame to perform the authentication and association procedures.

Meanwhile, the terminal may fail to the authentication/association with the BSS2. As a result, the terminal reports the traffic routing result to the cell 1 (S1370). The traffic routing result may specify that the traffic routing is unsuccessful. In more detail, the traffic routing result may be configured to indicate that the authentication or association with the BSS2 is unsuccessful.

The terminal that fails to accessing the WLAN access network performs the traffic processing through the cell 1 (S1380).

Additionally, the terminal may start the traffic routing criterion evaluation for the BSS1. When the BSS1 satisfies the traffic routing criterion evaluation, the terminal may report the evaluation result again and receive the traffic routing indication indicating that the traffic is routed to the BSS1. Therefore, the terminal may attempt the traffic processing through the BSS1.

Additionally, the traffic routing indication may include traffic routing direction information representing whether the routing to the WLAN access network from the 3GPP access network is to performed or whether the traffic routing to the 3GPP access network from the WLAN access network is to be performed. The terminal that receives the traffic routing indication including the traffic routing direction information performs the traffic routing in a direction indicated by the traffic routing direction. The terminal follows the aforementioned routing procedure when the routing from the 3GPP access network to the WLAN access network is indicated. When the routing from the WLAN access network to the 3GPP access network is indicated, the terminal performs the traffic processing of some or all of the traffic which is processed in the WLAN access network. When there is no RRC connection, the terminal makes the RRC connection with the 3GPP access network and thereafter, processes the traffic in the WLAN access network in the 3GPP access network. After the terminal makes the successful RRC connection in the 3GPP access network or data processing starts in the 3GPP access network, the terminal may release the connection with the WLAN access network.

The terminal and the base station performs setting/evaluating the traffic routing criterion, evaluation result reporting, and traffic processing through the WLAN in the aforementioned embodiment, but the present invention is not limited thereto. That is, the traffic routing criterion for the general non-3GPP access network may be set/evaluated and the terminal may generate the information on the non-3GPP access network and report the generated information to the network. Further, the terminal may process some or all of the 3GPP traffic through the non-3GPP access network.

According to the communication method of the embodiment of the present invention, in the interworking between the 3GPP access network and the non-3GPP access network, the base station of the 3GPP access network may control the interworking. The base station controls the operation of the terminal with a control right for the terminal to control the loads of the core network and the radio link. Therefore, the base station can satisfy the terminal that receives the service in the cell or the QoS of the specific traffic of the terminal by efficiently using the radio resource.

Figure 14:
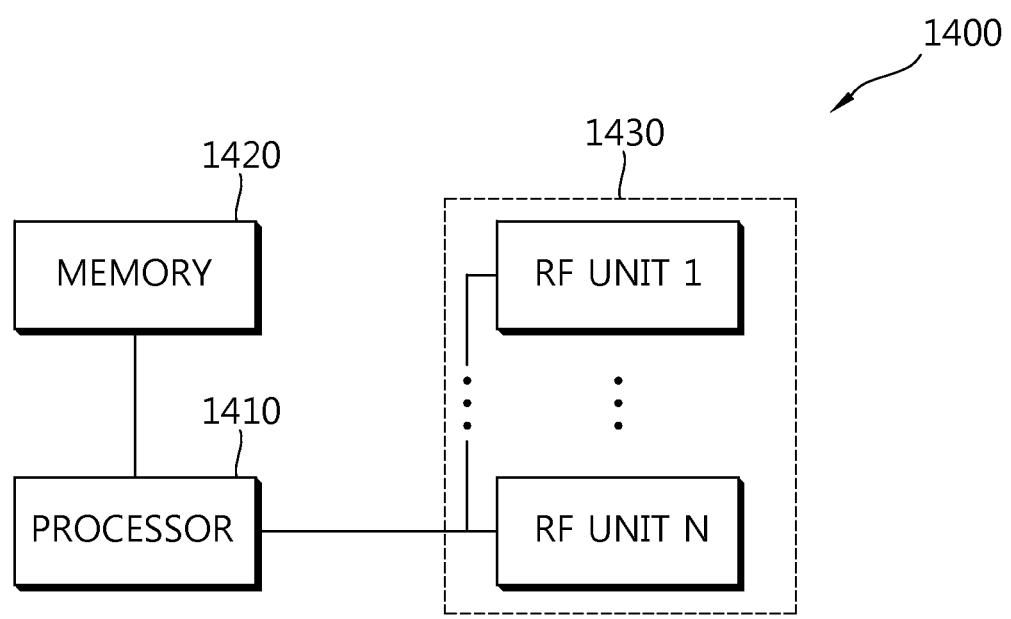
FIG. 14 is a block diagram illustrating a wireless apparatus in which the embodiment of the present invention may be implemented.

FIG. 14 is a block diagram illustrating a wireless apparatus in which an embodiment of the present invention can be implemented. The apparatus may implement the terminal and/or network (base station or another network entity) in the embodiment of FIGS. 10 to 13.

Referring to FIG. 14, the wireless apparatus 1400 includes a processor 1410, a memory 1420, and a radio frequency (RF) unit 1430.

The processor 1410 implements a function, a process, and/or a method which are proposed. The processor 1410 may be configured to set the traffic routing criterion and/or evaluate whether the traffic routing criterion is satisfied in order to process the 3GPP traffic through the non-3GPP access network according to the embodiment of the present invention. The processor 1410 may be configured to generate the traffic routing criterion evaluation result and report the generated traffic routing criterion evaluation result. The processor 1410 may be configured to decide the routing or not based on the traffic routing criterion evaluation result. The processor 1410 is configured to process the traffic through the 3GPP access network and/or the non-3GPP access network. The processor 1410 may be configured to perform the embodiment of the present invention described with reference to FIGS. 10 to 13.

The RF unit 1430 is connected with the processor 1410 to transmit and/or receive a radio signal. The RF unit 1430 may include one or more RF units for 3GPP based access network communication and non-3GPP based access network communication.

The processor may include an application-specific integrated circuit (ASIC), different chip sets, a logic circuit, and/or a data processing apparatus. In FIG. 14, it is illustrated that the single processor 1410 is configured to control and manage all RF units for each access network communication, but the wireless apparatus according to the present invention is not limited thereto. An embodiment in which the respective RF units for each access network communication are functionally coupled with the respective processors may be available.

The memory 1420 may include a read-only memory (ROM), a random access memory (RAM), a flash memory, a memory card, a storage medium, and/or other storage device. The RF unit 1430 may include a baseband circuit for processing the radio signal. When the exemplary embodiment is implemented by software, the aforementioned technique may be implemented by a module (a process, a function, and the like) performing the aforementioned function. The module may be stored in the memory 1420 and executed by the processor 1410. The memory 1420 may be present inside or outside the processor 1410 and connected with the processor 1410 by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for communicating carried out by a terminal in a wireless communication system supporting a multiple access network, the method comprising:
receiving a traffic routing configuration from a first access network, the traffic routing configuration specifying a traffic routing criterion for routing and processing traffic;
searching a second access network to discover a second access network entity,
wherein the second access network is searched by receiving at least one beacon frame transmitted from the second access network,
wherein the beacon frame includes an identifier of the second access network and system information for operating the second access network, and
wherein the system information included in the beacon frame comprises load information indicating a load level of the second access network;
performing traffic routing evaluation determining whether the second access network entity satisfies the traffic routing criterion;
reporting a routing evaluation result to the first access network when the traffic routing criterion is satisfied,
wherein the routing evaluation result includes all of the identification information indicating at least one entity satisfying the traffic routing criterion among at least one of a plurality of entities of the second access network, channel information of the at least one entity satisfying the traffic routing criterion, and information on the first access network traffic, and
wherein the reporting of the routing evaluation result is delayed after the traffic routing criterion is satisfied such that traffic routing evaluation can be performed for all access networks including the plurality of entities of the second access network;
receiving a traffic routing indication from the first access network; and
processing the traffic based on the traffic routing indication,
wherein, when the traffic routing indication indicates that traffic of the first access network is processed through the second access network, in the processing of the traffic based on the traffic routing indication, the traffic of the first access network is processed through the second access network, and
wherein the second access network entity indicated by the traffic routing indication is selected by the first access network among the plurality of entities of the second access network indicated by the identification information of the routing evaluation result.

2. The method of claim 1, wherein:
the traffic routing indication indicates the second access network entity for processing the traffic of the first access network, and
the traffic of the first access network is processed by the second access network entity indicated by the traffic routing indication.

3. The method of claim 2, wherein the traffic routing indication further includes:
an identifier indicating the second access network entity, and
traffic information on traffic of which processing through the second access network entity is permitted.

4. The method of claim 3, wherein the traffic information includes a radio bearer identifier list associated with the traffic of which processing through the second access network entity is permitted.

5. The method of claim 4, wherein the processing of the traffic of the first access network includes processing the traffic indicated by the traffic information of the traffic routing indication among the traffic of the first access network through the second access network entity.

6. The method of claim 1, wherein the information on the first access network traffic includes a radio bearer identifier list associated with the first access network traffic.

7. The method of claim 1, wherein the traffic routing configuration includes a routing entity list including the second access network entity in which the traffic processing of the first access network is permitted.

8. The method of claim 7, wherein the performing of the traffic routing evaluation includes deciding, when the second access network entity discovered by the search is included in the routing entity list, that the corresponding second access network entity satisfies the traffic routing criterion.

9. The method of claim 1, further comprising:
reporting a result of the traffic processing of the first access network to the first access network.

10. The method of claim 9, further comprising:
releasing a radio resource control (RRC) connection with the first access network after reporting the first access network traffic processing result.

11. The method of claim 9, further comprising:
receiving traffic processing confirmation from the first access network as a response to the first access network traffic processing result reporting; and
releasing the RRC connection with the first access network when the traffic processing confirmation indicates that the first access network traffic is normally processed.

12. The method of claim 1, wherein when the traffic routing indication indicates that traffic of the second access network is processed through the first access network, the processing of the traffic based on the traffic routing indication includes processing the traffic of the second access network through the first access network.

13. The method of claim 1, wherein:
the first access network is a 3rd generation partnership project (3GPP) based access network, and
the second access network is a wireless local area network (WLAN) based access network.

14. A wireless apparatus that operates in a wireless communication system, the wireless apparatus comprising:
a first radio frequency (RF) unit configured to transmit and receive a first access network signal;
a second RF unit configured to transmit and receive a second access network signal; and
a processor that operates in functional combination with the first RF unit and the second RF unit,
wherein the processor is configured to:
receive a traffic routing configuration from a first access network, the traffic routing configuration specifying a traffic routing criterion for routing and processing traffic,
search a second access network to discover a second access network entity,
wherein the second access network is searched by receiving at least one beacon frame transmitted from the second access network,
wherein the beacon frame includes an identifier of the second access network and system information for operating the second access network, and
wherein the system information included in the beacon frame comprises load information indicating a load level of the second access network,
perform traffic routing evaluation determining whether the second access network entity satisfies the traffic routing criterion,
report a routing evaluation result to the first access network when the traffic routing criterion is satisfied,
wherein the routing evaluation result includes all of the identification information indicating at least one entity satisfying the traffic routing criterion among at least one of a plurality of entities of the second access network, channel information of the at least one entity satisfying the traffic routing criterion, and information on the first access network traffic, and
wherein the reporting of the routing evaluation result is delayed after the traffic routing criterion is satisfied such that traffic routing evaluation can be performed for all access networks including the plurality of entities of the second access network,
receive a traffic routing indication from the first access network, and
process the traffic based on the traffic routing indication,
wherein, when the traffic routing indication indicates that traffic of the first access network is processed through the second access network, the processing of the traffic based on the traffic routing indication includes the traffic of the first access network through the second access network, and
wherein the second access network entity indicated by the traffic routing indication is selected by the first access network among the plurality of entities of the second access network indicated by the identification information of the routing evaluation result.

\* \* \* \* \*